US011987141B2

(12) United States Patent
Labell et al.

(10) Patent No.: US 11,987,141 B2
(45) Date of Patent: *May 21, 2024

(54) CHARGING SYSTEM FOR A VEHICLE

(71) Applicant: Westfalia Technologies, Inc., York, PA (US)

(72) Inventors: Daniel Labell, Mechanicsburg, PA (US); David Matthew Weder, Smoketown, PA (US); Ian Todd, Mount Pleasant, SC (US)

(73) Assignee: Westfalia Technologies, Inc., York, PA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/215,975

(22) Filed: Mar. 29, 2021

(65) Prior Publication Data
US 2022/0055491 A1    Feb. 24, 2022

Related U.S. Application Data

(63) Continuation-in-part of application No. 16/999,655, filed on Aug. 21, 2020.

(51) Int. Cl.
| | |
|---|---|
| *B60L 53/16* | (2019.01) |
| *B60L 53/18* | (2019.01) |
| *B60L 53/35* | (2019.01) |
| *B60L 53/53* | (2019.01) |
| *H01R 13/447* | (2006.01) |
| *H01R 13/629* | (2006.01) |

(52) U.S. Cl.
CPC .............. *B60L 53/16* (2019.02); *B60L 53/18* (2019.02); *B60L 53/35* (2019.02); *H01R 13/629* (2013.01); *B60L 53/53* (2019.02); *H01R 13/447* (2013.01); *H01R 2201/26* (2013.01)

(58) Field of Classification Search
CPC ........ B60L 53/37; B60L 53/18; B60L 53/665; B60L 53/36; B60L 2250/14; E04H 6/42
See application file for complete search history.

(56) References Cited

U.S. PATENT DOCUMENTS

| | | | |
|---|---|---|---|
| 5,323,099 A | 6/1994 | Bruni et al. |
| 5,461,298 A | 10/1995 | Lara et al. |
| 7,999,506 B1 | 8/2011 | Hollar et al. |
| 9,595,790 B1 | 3/2017 | Cao |
| 10,052,962 B2 | 8/2018 | Dunger et al. |
| 10,647,216 B2 | 5/2020 | Seo et al. |

(Continued)

FOREIGN PATENT DOCUMENTS

| | | | |
|---|---|---|---|
| CN | 107264318 A | 10/2017 |
| CN | 108437826 A | 8/2018 |

(Continued)

OTHER PUBLICATIONS

Machine translation of JP-2011117155-A. (Year: 2022).*

(Continued)

*Primary Examiner* — David V Henze-Gongola
(74) *Attorney, Agent, or Firm* — Barley Snyder

(57) ABSTRACT

A charging system for a vehicle includes a connector suspended on a flexible cable and movable along at least one of a plurality of axes perpendicular to one another and a charging port fixed to the vehicle. The connector is movable into a mated position with the charging port.

19 Claims, 21 Drawing Sheets

(56) References Cited

U.S. PATENT DOCUMENTS

| | | |
|---|---|---|
| 10,696,168 B2 | 6/2020 | Meier |
| 10,711,506 B2 | 7/2020 | Rhodes et al. |
| 2011/0074351 A1 | 3/2011 | Bianco et al. |
| 2013/0088194 A1 | 4/2013 | Hunter et al. |
| 2014/0035527 A1 | 2/2014 | Hayashigawa et al. |
| 2014/0266004 A1* | 9/2014 | Andrews, Jr. ........... B60L 58/12 320/108 |
| 2014/0354229 A1 | 12/2014 | Zhao et al. |
| 2017/0028864 A1* | 2/2017 | Gerhold ................. B60L 53/11 |
| 2017/0136893 A1 | 5/2017 | Ricci |
| 2018/0062330 A1 | 3/2018 | Roberts |
| 2019/0061542 A1 | 2/2019 | Zhao et al. |
| 2019/0232811 A1 | 8/2019 | Wastel |
| 2019/0315240 A1 | 10/2019 | Wu |
| 2019/0340782 A1 | 11/2019 | Sinha et al. |
| 2019/0389321 A1 | 12/2019 | Spincich et al. |
| 2020/0016985 A1 | 1/2020 | Sham |
| 2020/0031248 A1 | 1/2020 | Kwak et al. |
| 2020/0198489 A1 | 6/2020 | Yoon |
| 2020/0207233 A1 | 7/2020 | Sato et al. |
| 2020/0282852 A1 | 9/2020 | Valli |
| 2021/0001740 A1* | 1/2021 | Machida ................. B60L 53/36 |
| 2022/0055491 A1 | 2/2022 | Labell et al. |
| 2022/0055495 A1* | 2/2022 | Labell .................... B60L 53/37 |

FOREIGN PATENT DOCUMENTS

| | | | |
|---|---|---|---|
| DE | 102018003467 A1 | | 10/2019 |
| IN | 106004500 A | | 10/2016 |
| JP | 2011117155 A | * | 6/2011 |
| JP | 2019075875 A | | 5/2019 |
| KR | 101792792 B1 | | 11/2017 |
| KR | 11895550 B1 | | 10/2018 |
| KR | 102022781 B1 | | 9/2019 |
| WO | 2013041133 A1 | | 3/2013 |
| WO | 2017109594 A1 | | 6/2017 |
| WO | WO-2020130390 A1 | * | 6/2020 .......... B25J 15/0286 |

OTHER PUBLICATIONS

Machine translation of WO 2020130390 A1 (Year: 2023).*
PCT International Search Report and Written Opinion, Application No. PCT/US2022/022330, dated Jul. 19, 2022.
Abstract of KR 102022781, dated Sep. 18, 2019, 1 page.
Abstract of KR 101792792, dated Nov. 2, 2017, 1 page.
Abstract of CN 106004500, dated Oct. 12, 2016, 1 page.
Abstract of CN 107264319, dated Oct. 20, 2017, 2 pages.
Notification of Transmittal of International Preliminary Report on Patentability dated Oct. 12, 2023, corresponding to Application No. PCT/US2022/022330, 8 pages.

* cited by examiner

CHARGING SYSTEM FOR A VEHICLE

CROSS-REFERENCE TO RELATED APPLICATION

This application is a continuation-in-part of U.S. patent application Ser. No. 16/999,655, filed on Aug. 21, 2020.

FIELD OF THE INVENTION

The present invention relates to a charging system and, more particularly, to a charging system for a vehicle.

BACKGROUND

Charging a battery of an electric or plug-in hybrid vehicle most commonly requires a user to find a charging station and manually insert a charging plug into the charging port of the vehicle. Due to issues including capacity, availability, and inefficiency of timing for multiple vehicles requiring various levels of charge, some automated charging systems have been developed that charge vehicles in certain charging locations. These systems, however, still require significant human intervention for the charging, require expensive configurations that are not adaptable to available vehicles, and/or fail to adapt to different plugging standards for different vehicles.

SUMMARY

A charging system for a vehicle includes a connector suspended on a flexible cable and movable along at least one of a plurality of axes perpendicular to one another and a charging port fixed to the vehicle. The connector is movable into a mated position with the charging port.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
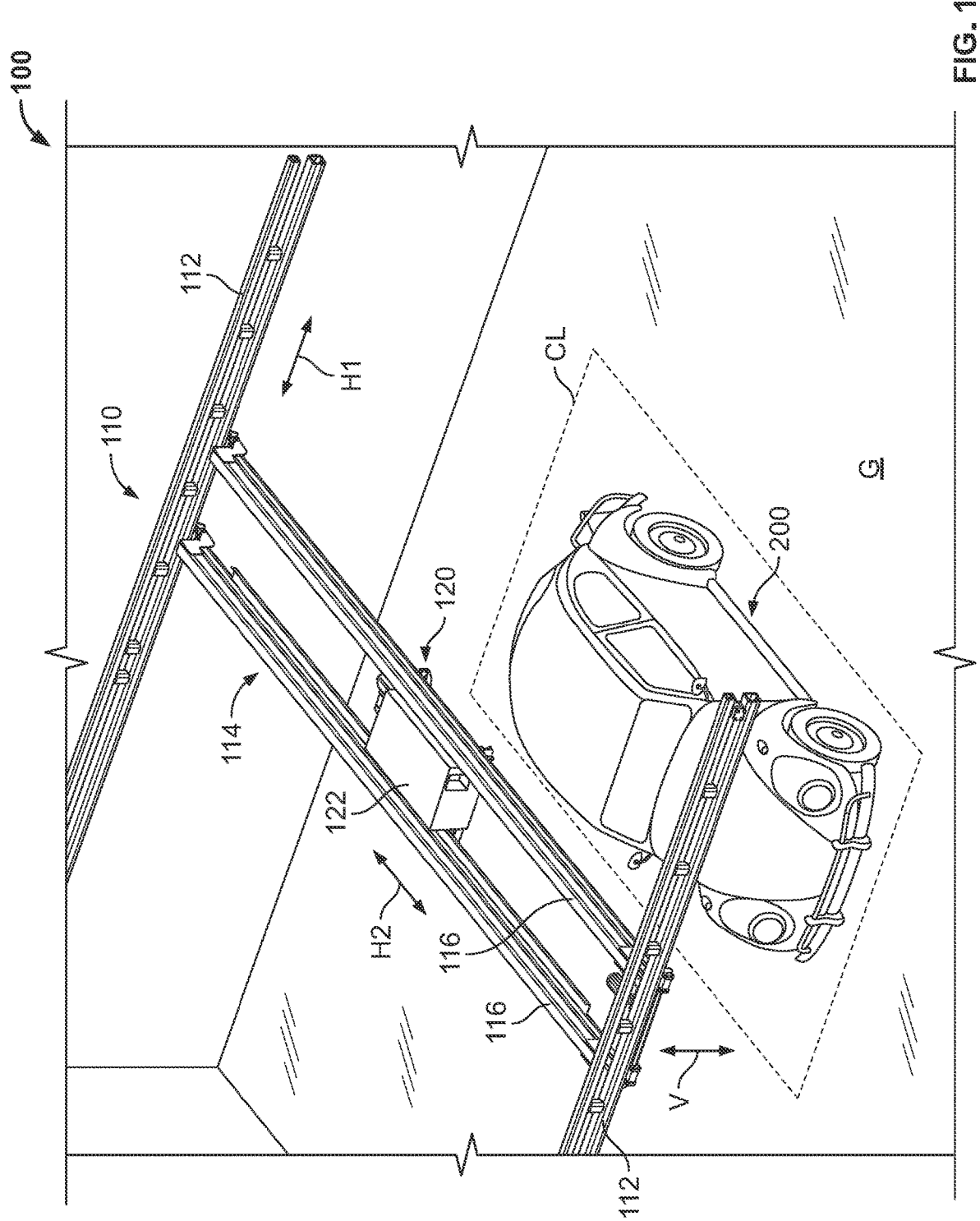
FIG. 1 is a perspective view of a charging system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

A charging system 100 according to an embodiment for a vehicle 200 is shown in FIGS. 1-6. The charging system 100 includes an overhead moving system 110, a connector 140 attached to and movable with the overhead moving system 110, an adapter 150 pluggable into the vehicle 200 and matable with the connector 140, a vision system 160, and a charging controller 170 connected to the vision system 160 and controlling movement of the overhead moving system 110.

Figure 2:
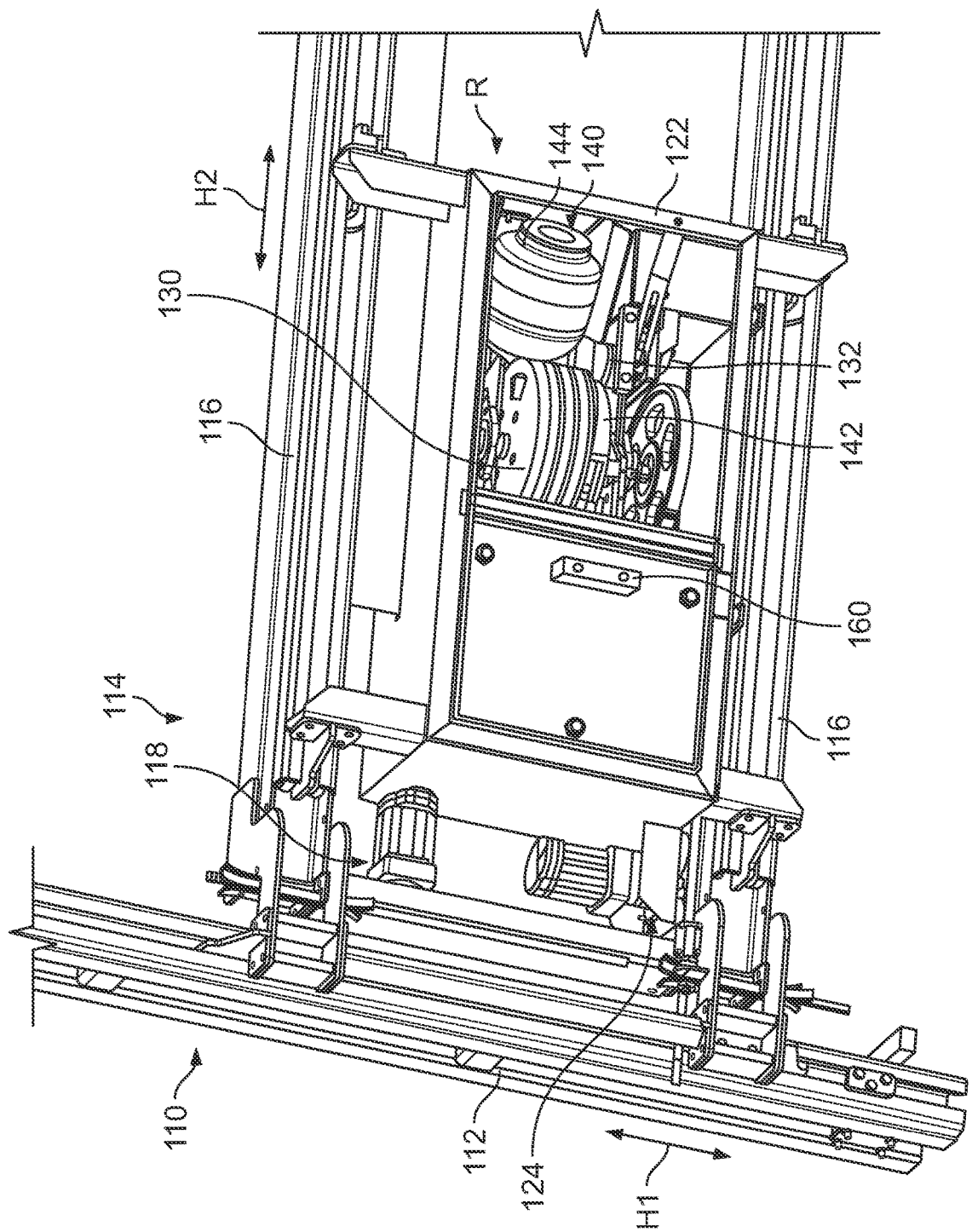
FIG. 2 is a perspective view of an overhead moving system of the charging system.

The overhead moving system 110, as shown in FIGS. 1 and 2, includes a pair of support rails 112, a bridge 114 movable along the pair of support rails 112, a trolley 120 movable along the bridge 114, and a cable reel 130 disposed in the trolley 120. In an embodiment, the overhead moving system 110 is a gantry.

The pair of support rails 112, as shown in FIG. 1, extend parallel to one another and are spaced apart from one another. The support rails 112 have a fixed position along a plurality of axes that include a first horizontal axis H1, a second horizontal axis H2 perpendicular to the first horizontal axis H1, and a vertical axis V perpendicular to the first horizontal axis H1 and the second horizontal axis H2. In the shown embodiment, the support rails 112 each extend along the first horizontal axis H1 and are spaced apart from one another along the second horizontal axis H2. The support rails 112 are positioned in the vertical axis V over at least one charging storage location CL on a ground surface G in which a vehicle 200 is parked. The support rails 112 may be fixed to a ceiling, extend between walls, may be supported from the ground surface G, or may have any other type of securing that fixes the support rails 112 in position over at least one charging storage location CL.

The bridge 114, as shown in FIGS. 1 and 2, has a pair of bridge rails 116 attached at opposite ends to the support rails 112. The bridge rails 116 extend along the second horizontal axis H2 and are spaced apart from one another along the first horizontal axis H1. The bridge 114, at each of the opposite ends of the bridge rails 116, has a bridge drive 118 connected to the bridge rails 116, as shown in FIG. 2. The bridge drive 118 engages the support rails 112 and is drivable to move the bridge 114 along the first horizontal axis H1 along the support rails 112. The bridge drive 118 may include a motor driving a timing belt, a motor driving a plurality of wheels, or any other element capable of providing a controllable driving force to move the bridge 114 along the first horizontal axis H1.

The trolley 120, as shown in FIGS. 1 and 2, has a trolley housing 122 disposed between the bridge rails 116, held by the bridge 114, and a trolley drive 124 connected to the trolley housing 122. The trolley drive 124 is drivable to move the trolley housing 122 along the second horizontal axis H2 along the bridge rails 116. The trolley drive 124 may include a motor driving a timing belt, a motor driving a plurality of wheels, or any other element capable of providing a controllable driving force to move the trolley housing 122 along the second horizontal axis H2.

The cable reel 130, as shown in FIG. 2, is disposed in the trolley housing 122. The cable reel 130 is rotatable within the trolley housing 122 by a reel drive 132 attached to the cable reel 130. The reel drive 132 can be any element capable of rotating the cable reel 130 within the trolley housing 122.

Figure 3:
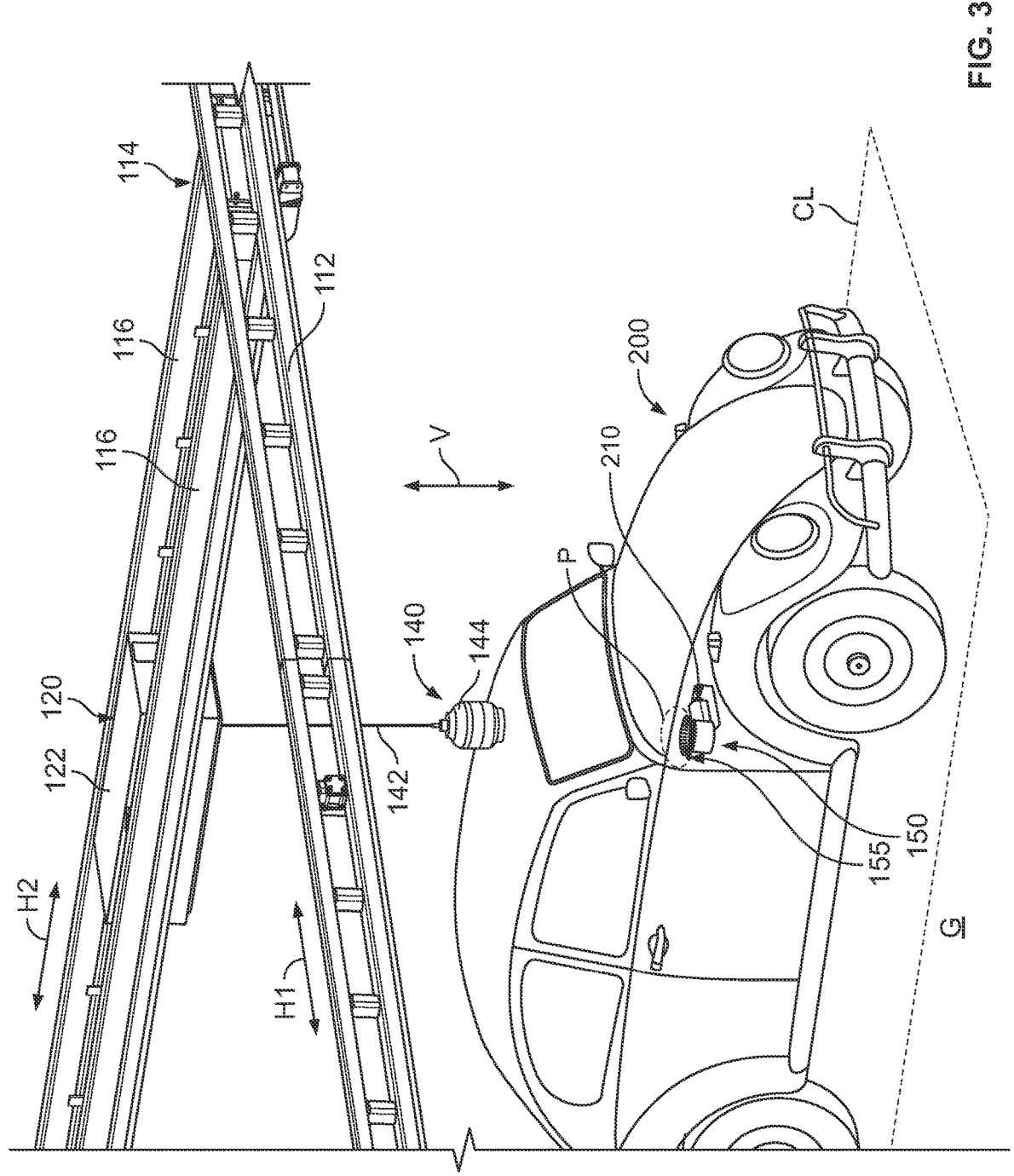
FIG. 3 is a perspective view of the charging system with an adapter inserted into a charging port of a vehicle.
Figure 4:
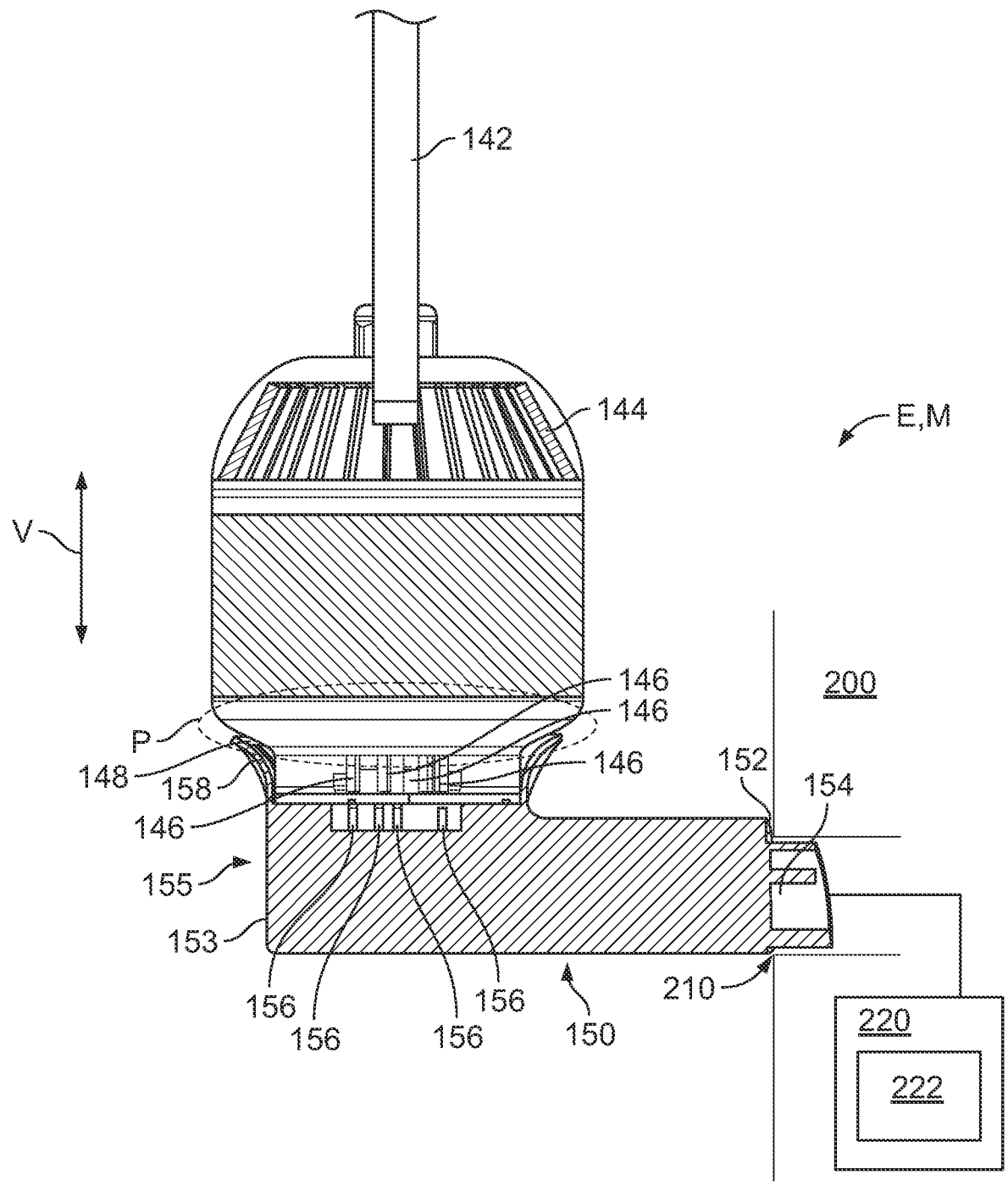
FIG. 4 is a sectional side view of a connector of the charging system in a mated position with the adapter.

The connector 140, as shown in FIGS. 2-4, includes a connector housing 144 attached to an end of a flexible cable 142. In the shown embodiment, the flexible cable 142 is capable of conducting various ranges of AC or DC voltages that can be used to charge a vehicle 200. In other embodiments, the flexible cable 142 may be any type of flexible electrical cable usable in any vehicle charging application. The flexible cable 142, as shown in FIG. 2, is wound around the cable reel 130 and attached to the trolley 120 at the cable reel 130. The connector 140 is suspended on the flexible cable 142 from the cable reel 130.

In the connector housing 144, as shown in FIG. 4, the connector 140 has a plurality of first contacts 146 electrically connected to the flexible cable 142 and a first alignment element 148. In the shown embodiment, the first alignment element 148 is an outer profile of the connector housing 144. In other embodiments, the first alignment element 148 could be a magnet disposed within the connector housing 144, or could be any element or any combination of elements that contributes to positioning the connector 140 in a mating alignment orientation as described in greater detail below.

The adapter 150, as shown in FIGS. 3 and 4, has a first end 152 with a plug 154 and a second end 153 opposite the first end 152 with an adapter port 155. The plug 154 meets one of a plurality of connector standards for charging vehicles, for example, SAE J1772 or IEC 62196. The plug 154, however, can be any type of connector that meets any known standard in charging vehicles or is otherwise usable in charging vehicles.

The adapter port 155, as shown in FIG. 4, has a plurality of second contacts 156 electrically connected to the plug 154 and a second alignment element 158. In the shown embodiment, the second alignment element 158 is a profile of the adapter port 155. In other embodiments, the second alignment element 158 could be a magnet disposed within the adapter port 155, or could be any element or any combination of elements that contributed to positioning the connector 140 in the mating alignment orientation in the adapter port 155 as described in greater detail below.

The vision system 160, as shown in FIGS. 1 and 2, is disposed on the trolley housing 122 and faces toward the ground surface G and the charging storage location CL. The vision system 160 can be any type of imaging device, for example a camera, that is capable of outputting vision data for processing that is sufficiently detailed to permit identification of discrete elements in the field of vision of the vision system 160.

Figure 5:
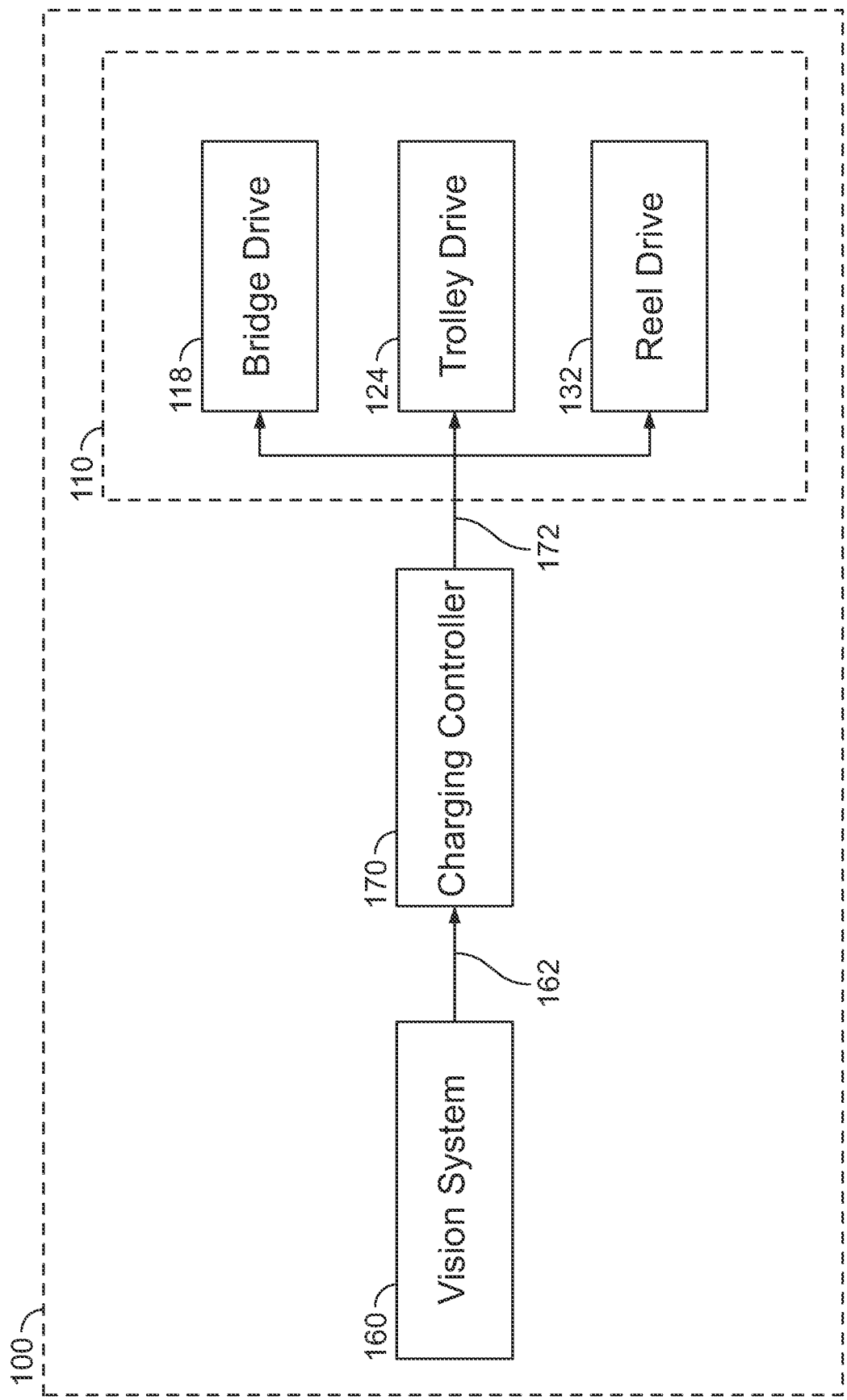
FIG. 5 is a block diagram of connections of a charging controller of the charging system.

The charging controller 170, as shown in FIG. 5, is connected to the vision system 160 and the overhead moving system 110. The charging controller 170 includes a processor and a plurality of instructions stored on a non-transitory computer readable medium that, when executed by the processor, performs the functions of the charging controller 170 described herein. In an embodiment, the charging controller 170 is disposed in the trolley housing 122. In other embodiments, the charging controller 170 can be disposed anywhere in the charging system 100, including remotely, provided the charging controller 170 is capable of controlling the elements of the charging system 100 as described in detail below.

A charging process 600 of automatically charging the vehicle 200 parked in the charging storage location CL with the charging system 100 will now be described in greater detail primarily with reference to FIG. 6.

The vehicle 200, as shown in FIGS. 3 and 4, includes a charging port 210 and a battery 220 connected to the charging port 210. The charging port 210 may be adapted to any known standard in charging vehicles or may be any port that is otherwise usable in charging vehicles. The charging port 210 is electrically connected to the battery 220. In an embodiment, the battery 220 provides a motive power to the vehicle 200. The vehicle 200 may be a plug-in hybrid, a fully electric vehicle, or any other type of vehicle that has a charging port 210 for charging a battery 220. The battery 220 has a charge level 222 indicating a current capacity of the battery 220.

Figure 6:
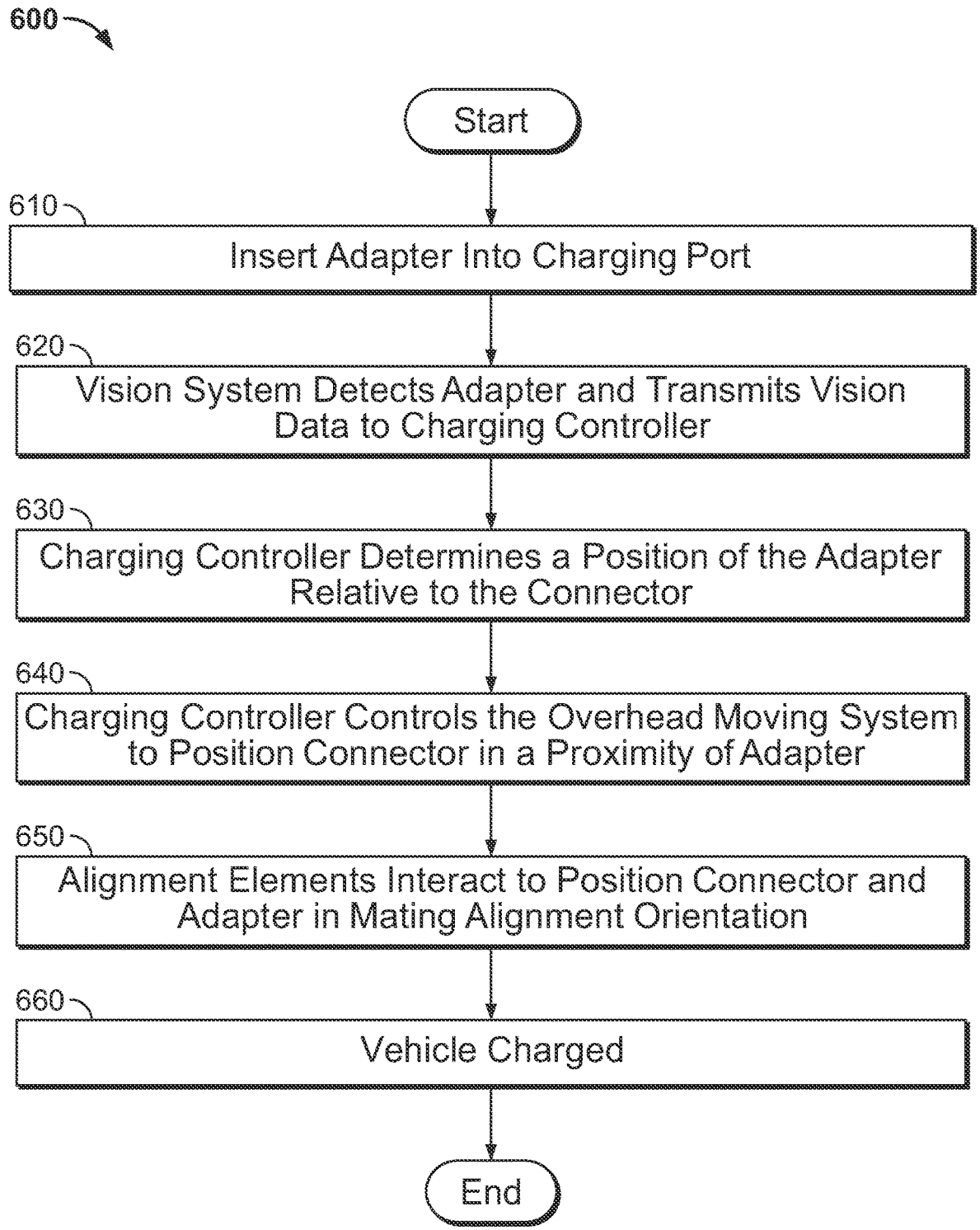
FIG. 6 is a flowchart of a charging process of automatically charging the vehicle with the charging system.

In a first step 610 shown in FIG. 6, the adapter 150 is inserted into the charging port 210 as shown in FIGS. 3 and 4. The plug 154 is removably disposed in the charging port 210 and the adapter port 155 extends outward from the vehicle 200. The plug 154 mates with the charging port 210 and electrically connects with the charging port 210. The adapter 150 may be inserted into the charging port 210 prior to moving the vehicle 200 into the charging storage location CL, as described in greater detail in an embodiment below, or may be inserted into the charging port 210 after the vehicle 200 is moved to the charging storage location CL.

In a step 620, shown in FIG. 6, the vision system 160 detects the adapter 150 positioned in the charging port 210. The adapter 150 is in a field of view of the vision system 160 that faces the ground surface G and the charging storage location CL, as shown in FIGS. 2 and 3. The vision system 160, as shown in FIG. 5, transmits a vision data 162 to the charging controller 170 representative of the field of view including the adapter 150. The vision data 162 may be an image or any other type of data representative of the field of view of the vision system 160.

The charging controller 170, in a step 630 shown in FIG. 6, receives the vision data 162 from the vision system 160. The charging controller 170, by execution of the processor, locates the adapter 150 within the vision data 162 and determines a position of the adapter 150 relative to the connector 140 along the first horizontal axis H1, the second horizontal axis H2, and the vertical axis V.

Based on the location of the adapter 150 with respect to the connector 140, in a step 640 shown in FIG. 6, the charging controller 170 transmits a plurality of drive control signals 172 to the overhead moving system 110 as shown in FIG. 5. The drive control signals 172 control the bridge drive 118 to move the bridge 114 and position the connector 140 along the first horizontal axis H1, control the trolley drive 124 to move the trolley 120 and position the connector 140 along the second horizontal axis H2, and control the reel drive 132 to rotate the cable reel 130. The connector 140 is movable with respect to the trolley 120 along the vertical axis V by rotation of the cable reel 130. The cable reel 130 is rotatable to wind or unwind the flexible cable 142 and move the connector 140 between a retracted position R distal from the vehicle 200, shown in FIG. 2, and an extended position E proximal to the vehicle 200 along the vertical axis V, shown in FIG. 4. In a retracted position R shown in FIG. 2, the flexible cable 142 is fully wound around the cable reel 130 and the connector housing 144 is disposed within the trolley housing 122. The connector 140 is movable along the plurality of axes H1, H2, V by the overhead moving system 110.

The drive control signals 172 control the bridge drive 118, the trolley drive 124, and the reel drive 132 to position the connector 140 in a proximity P of the adapter port 155, as shown in FIGS. 3 and 4. In some embodiments, the overhead moving system 110 may not be able to positon the connector 140 in a mated position in the adapter port 155, but may only be able to position the connector 140 within the proximity P of the adapter port 155.

In these embodiments, in a step 650 shown in FIG. 6, the first alignment element 148 of the connector 140 interacts with the second alignment element 158 of the adapter port 155 to position the connector 140 in a mating alignment orientation with respect to the adapter port 155 from the proximity P. In the embodiment shown in FIG. 4, for example, the outer profile of the connector housing 144 serving as the first alignment element 148 abuts the profile of the adapter port 155 serving as the second alignment element 158 to properly position the connector 140 with respect to the adapter port 155 in the mating alignment orientation, allowing further movement of the connector 140 in the vertical axis V to a mated position with the adapter port 155. In an embodiment, the first alignment element 148 and the second alignment element 158 position the connector 140 along the first horizontal axis H1, the second horizontal axis H2, and the vertical axis V from the proximity P to the mating alignment orientation. In other embodiments, for example if the alignment elements 148, 158 are magnets, the alignment elements 148, 158 may also properly position the connector 140 in a rotational orientation about the vertical axis V as part of the mating alignment orientation.

In other embodiments, the overhead moving system 110 can move the connector 140 into the mated position in the adapter port 155 in the mating alignment orientation without the use of the first alignment element 148 and the second alignment element 158.

In all embodiments, the movement of the overhead system 110 controlled by the charging controller 170 in steps 640 and 650 automatically positions the connector 140 in the mating alignment orientation and the mated position in the adapter port 155, as shown in FIG. 4. In the mated position, the first contacts 146 are electrically connected with the second contacts 156. In a step 660 shown in FIG. 6, the flexible cable 142 conducts an electrical supply that passes through the connected contacts 146, 156, through the plug 154, and to the battery 220 of the vehicle 200 to charge the battery 220.

In an embodiment, a user could drive their vehicle 200 to the charging storage location CL, park the vehicle 200, and insert the adapter 150 into the charging port 210 to begin the charging process 600 shown in FIG. 6. In another embodiment, the vehicle 200 could be moved to a charging storage location CL as part of an automated parking system 10.

Figure 7:
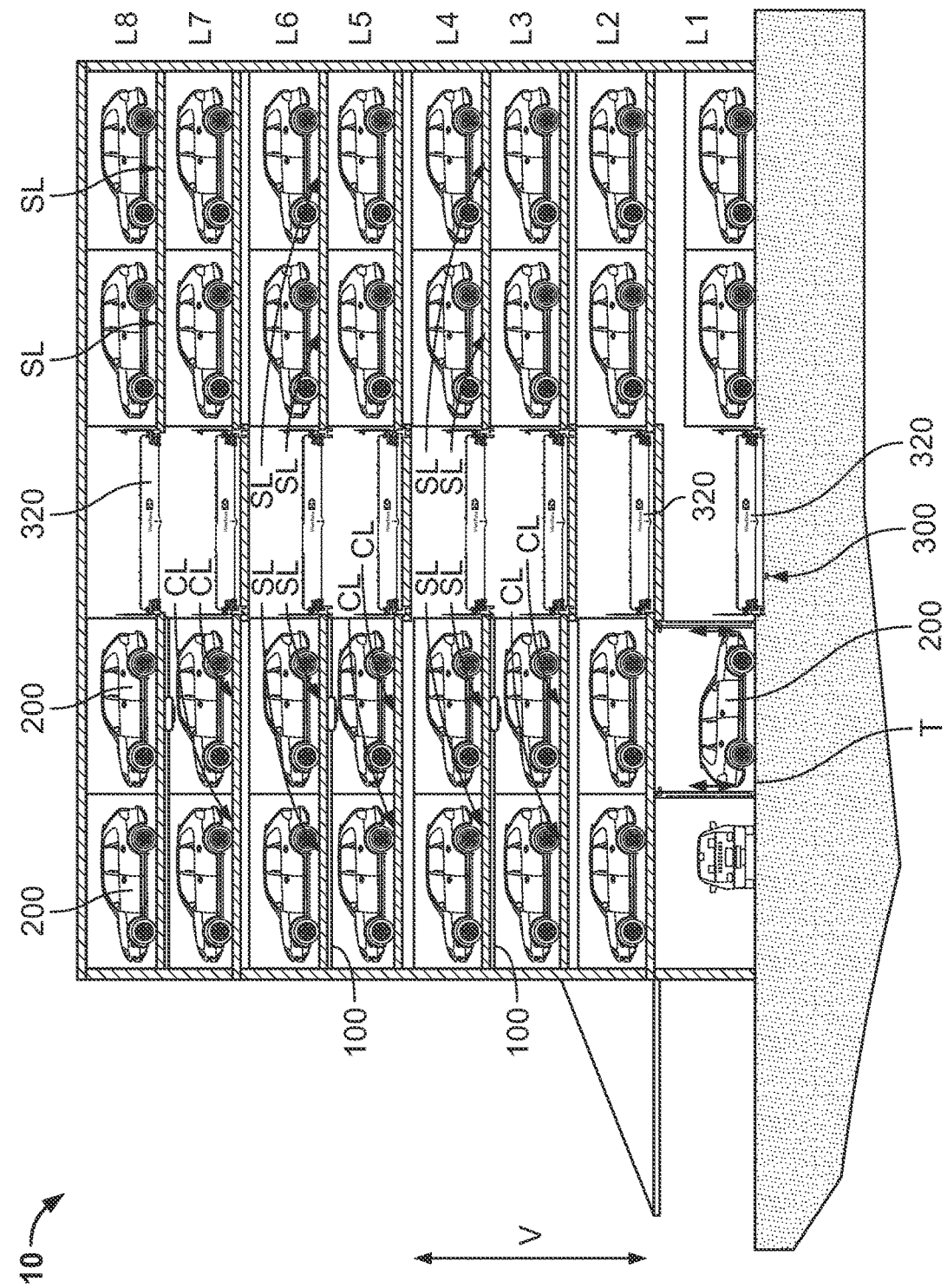
FIG. 7 is a sectional side view of an automated parking system according to an embodiment.
Figure 8:
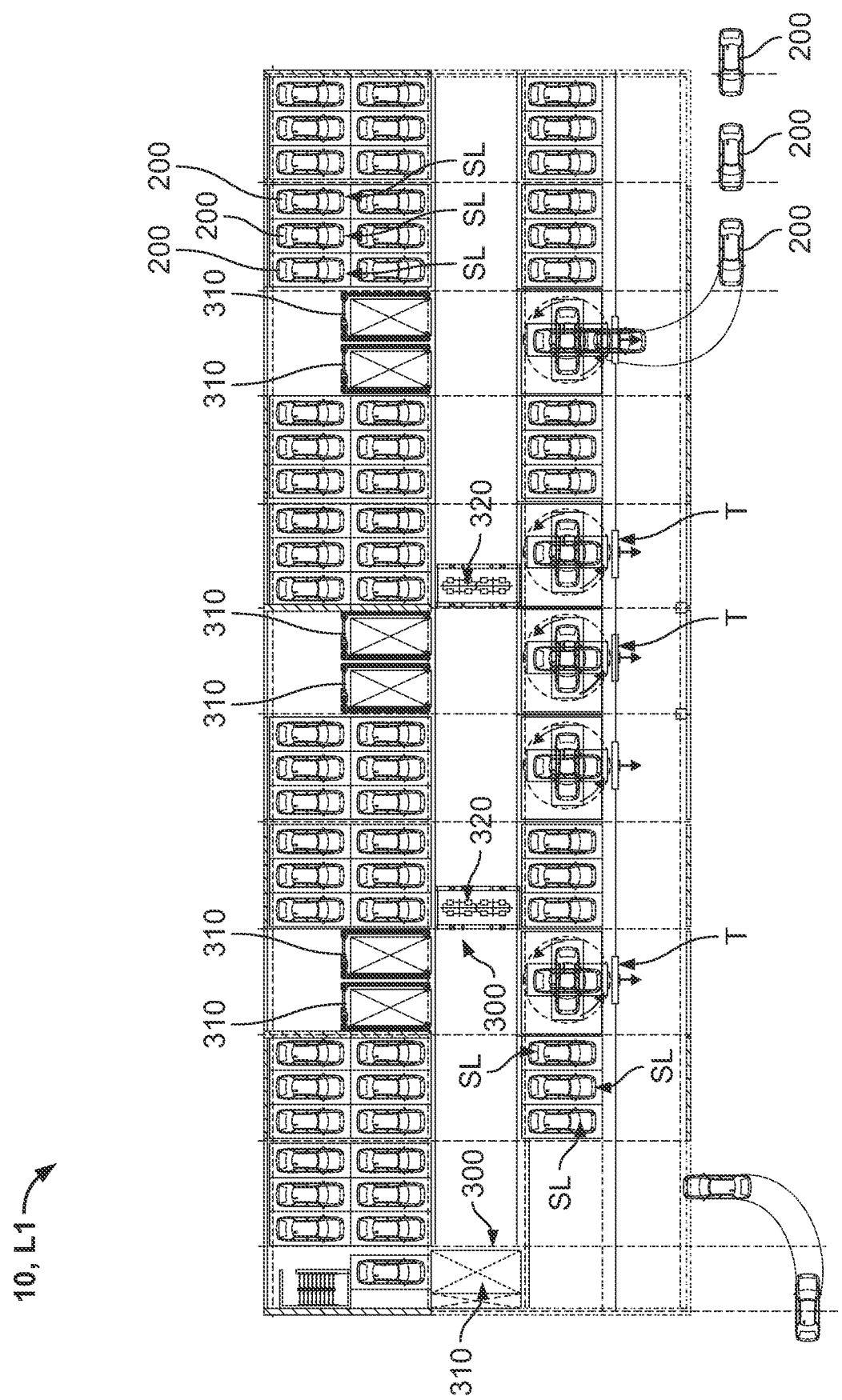
FIG. 8 is a top view of a first level of the automated parking system.
Figure 9:
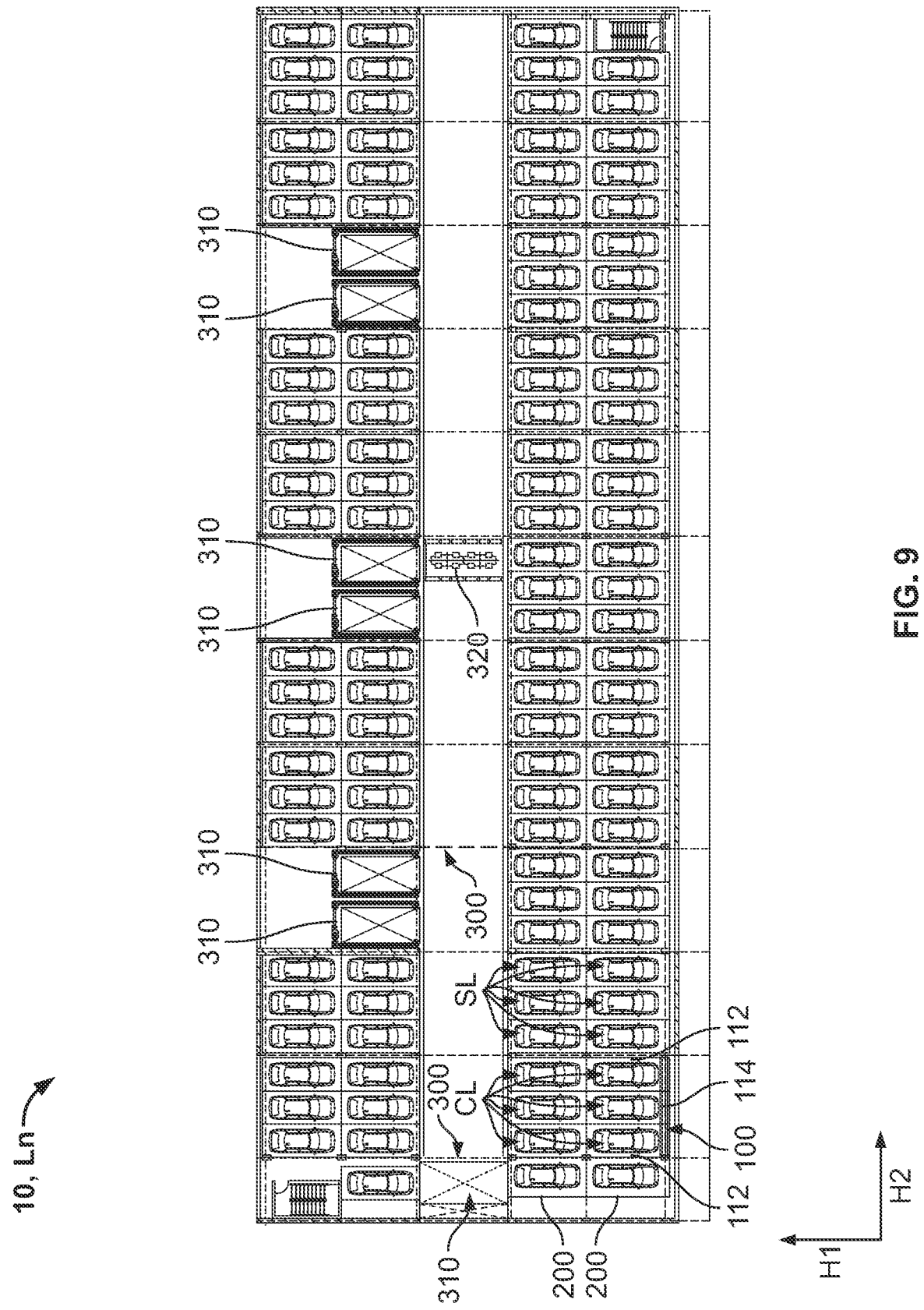
FIG. 9 is a top view of another level of the automated parking system.

An automated parking system (APS) 10 according to an embodiment is shown in FIGS. 7-9. The automated parking system 10 includes a transfer area T in which a user leaves a vehicle 200 and a plurality of levels L1, L2, L3 . . . Ln. In the embodiment shown in FIG. 7, the automated parking system 10 has eight levels L1-L8, however, in other embodiments, the APS 10 may have any number of levels including only one level L1. In FIGS. 7-9, only some of a plurality of like elements are labeled with reference numbers for clarity of the drawings. However, elements that appear identically in the drawings have identical components and functions to those labeled and described herein.

Each of the levels L1-Ln, as shown in FIGS. 7-9, has a plurality of standard storage locations SL and/or a plurality of charging storage locations CL. In FIGS. 7-9, for clarity, all charging storage locations CL are labeled and any non-labeled storage locations containing a vehicle 200 are standard storage locations SL. In the embodiment shown in FIGS. 7-9, for example, the first level L1 has only standard storage locations SL and other levels L3, L5, L7, Ln have both charging storage locations CL and standard storage locations SL. The arrangement of charging storage locations CL and standard storage locations SL as shown in FIGS. 7-9 is merely an exemplary embodiment however, and any level L1-Ln could have any combination of charging storage locations CL and standard storage locations SL.

The APS 10 includes a vehicle relocation system 300, shown in FIGS. 7-9, that is capable of automatically moving the vehicles 200 between the transfer area T, the plurality of standard storage locations SL, and the plurality of charging storage locations CL. In the shown embodiment, the vehicle relocation system 300 is a lift and shuttle system that includes a plurality of lifts 310 moving the vehicles 200 between the various levels L1-Ln and a plurality of shuttles 320 moving the vehicles 200 between the lifts 310 and the storage locations SL, CL on each individual level L1-Ln. In other embodiments, the vehicle relocation system 300 could be a pallet-based conveyor system, a stacker crane system, or any other movement system used in an automated storage system that is capable of moving the vehicles 200 between the transfer area T, the plurality of standard storage locations SL, and the plurality of charging storage locations CL.

As shown in FIGS. 7 and 9, each of the charging storage locations CL is reachable by a charging system 100 as shown in FIGS. 1-4 and described in detail above. In an embodiment, one charging system 100 can serve a plurality of charging storage locations CL; the connector 140 attached to the overhead moving system 110 is movable by the overhead moving system 110 anywhere within the plurality of charging storage locations CL. In the embodiment shown in FIG. 9, one charging system 100 can reach six different charging storage locations CL each containing a different vehicle 200, with the connector 140 capable of mating with the adapter 150 connected to any of the plurality of different vehicles 200 in the plurality of different charging storage locations CL. The adapter ports 155 of the various adapters 150 are the same across the different vehicles 200 in the different charging storage locations CL, even if the plugs 154 of the adapters 150 are different for different charging ports 210. In other embodiments, each charging system 100 can serve any number of charging storage locations CL, including only one charging storage location CL.

In the embodiment shown in FIG. 9, only one charging system 100 is located on the level Ln. In other embodiments, multiple charging systems 100 each serving multiple charging storage locations CL may be located on the same level Ln. The standard storage locations SL are not reachable by a charging system 100.

Figure 10:
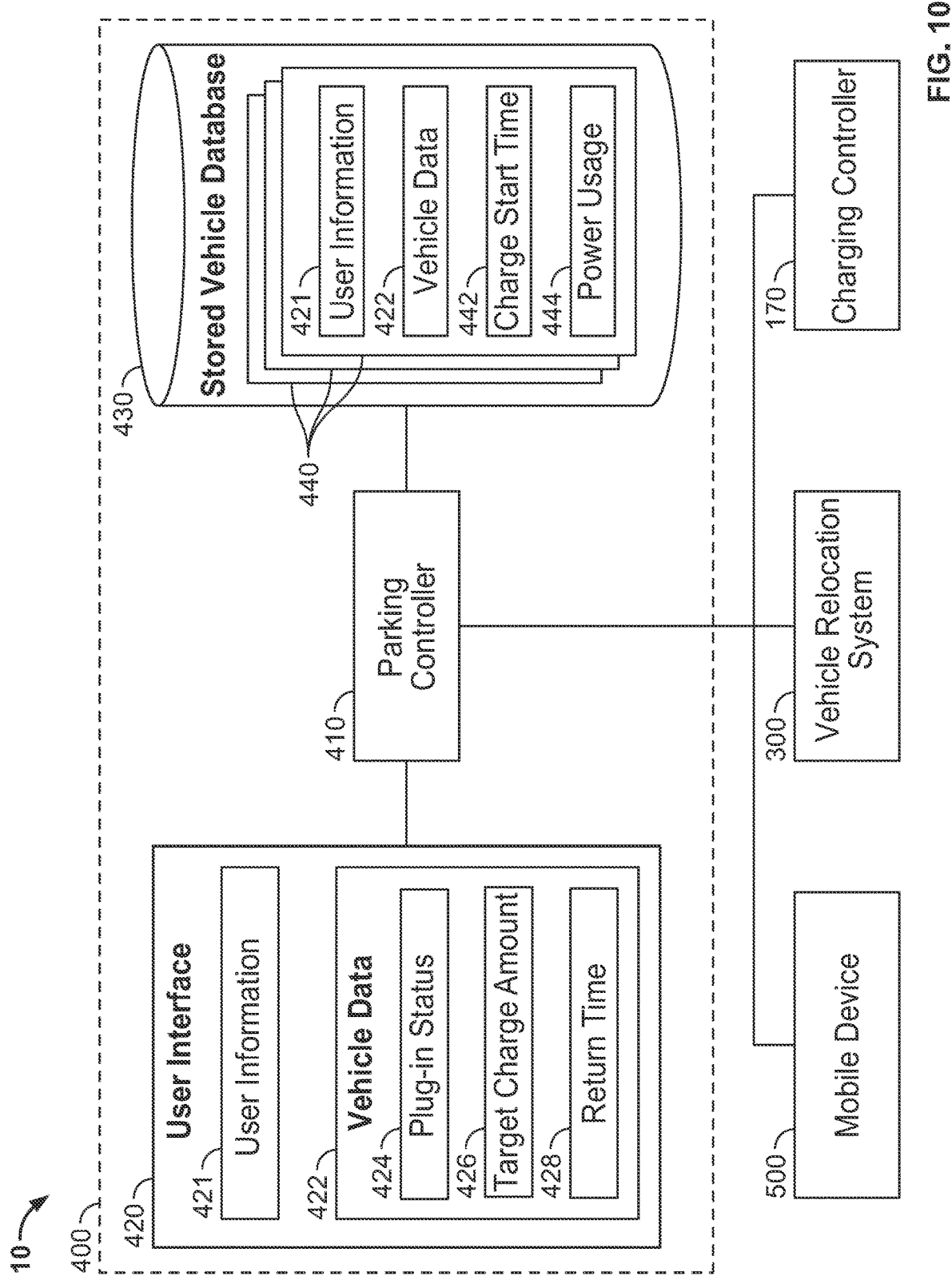
FIG. 10 is a block diagram of connections of a parking control system of the automated parking system.

The APS 10, as shown in FIG. 10, includes a parking control system 400 connected to the vehicle relocation system 300, the charging controller 170, and at least one mobile device 500.

The parking control system 400, as shown in FIG. 10, includes a parking controller 410, a user interface 420 connected to the parking controller 410, and a stored vehicle database 430 connected to the parking controller 410. The parking controller 410 includes a processor and a plurality of instructions stored on a non-transitory computer readable medium that, when executed by the processor, performs the functions of the parking controller 410 described herein. The user interface 420 may be a touch screen, a computing terminal, a computing kiosk, or any other type of standalone computing interface and, in an embodiment, is positioned just outside of the transfer area T. In this embodiment, each user interface 420 corresponds to one particular transfer area T of the APS 10. In other embodiments, the user interface 420 could be positioned anywhere within the APS 10 or in a proximity to the APS 10. In another embodiment, the user interface 420 may be part of the mobile device 500, and may be remote from the APS 10. The stored vehicle database 430 may be any type of computing database capable of storing and exchanging the data as described herein.

The mobile device 500, shown in FIG. 10, is associated with a user of one of the vehicles 200. The mobile device 500 may be a smart phone, a laptop, or any other type of mobile computing device associated with an individual and capable of exchanging the data as described herein.

A charging process 700 of automatically charging the vehicle 200 in the APS 10 will now be described in greater detail primarily with reference to FIGS. 11A and 11B. In the embodiments shown in FIGS. 7-11B and referenced in the charging process 700 below, only some of the vehicles 200 are capable of being plugged in to charge a battery 220.

Figure 11A:
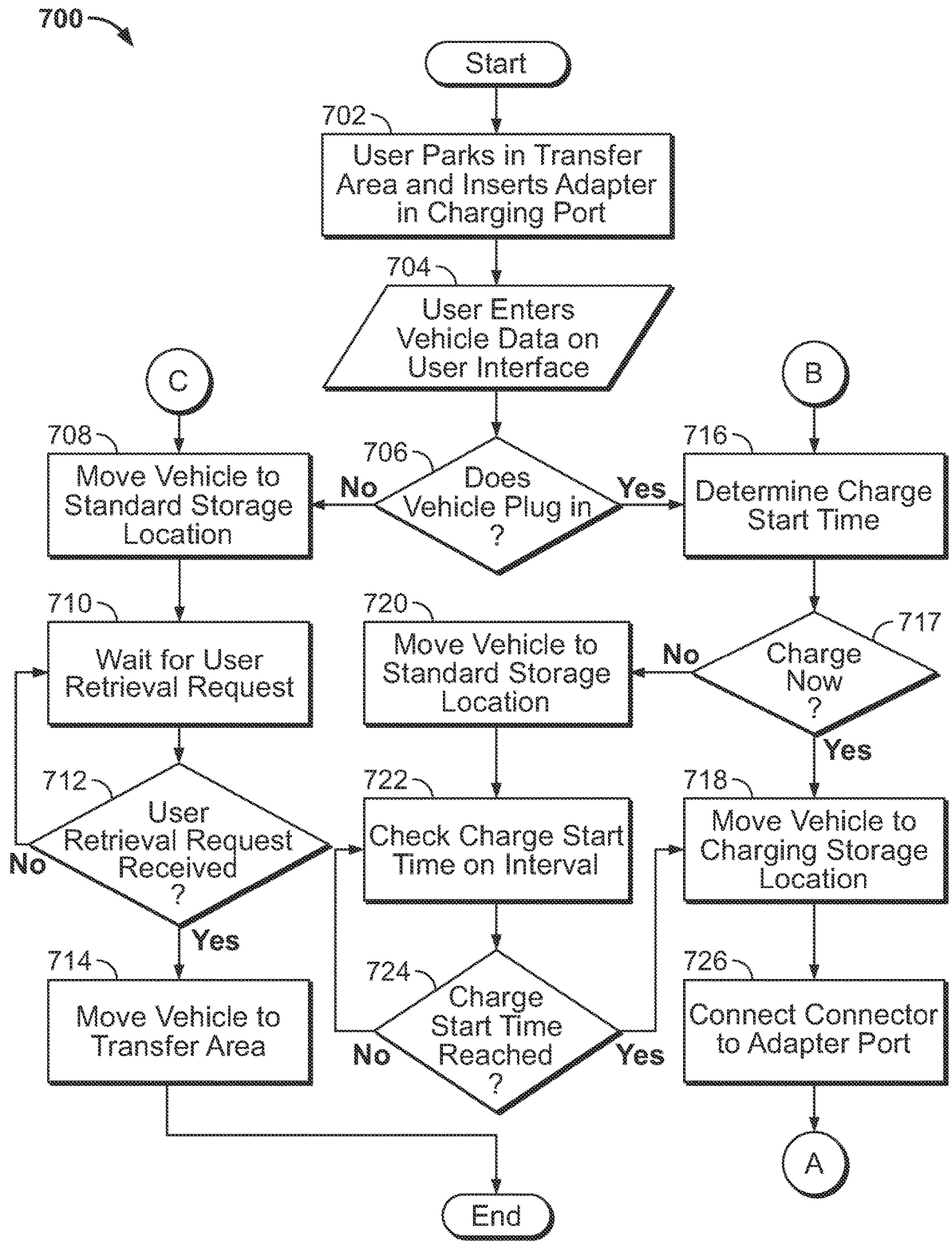
FIG. 11A is a flowchart of a charging process of automatically charging the vehicle in the automated parking system.

The charging process 700 starts, in a step 702 shown in FIG. 11A, with a user of a vehicle 200 driving the vehicle 200 into the transfer area T, as shown in FIGS. 7 and 8. If the vehicle 200 is a plug-in vehicle, the user has the adapter 150 for the vehicle 200 with the plug 154 of the adapter 150 corresponding to the charging port 210 of the vehicle 200. In an embodiment, the adapter 150 is associated with the vehicle 200 and travels with the vehicle 200, moving outside of the charging storage location CL having the charging system 100 and outside of the APS 10. The user inserts the plug 154 of the adapter 150 into the charging port 210, for example as shown in FIG. 3, while the vehicle 200 is positioned in the transfer area T.

In a step 704 shown in FIG. 11A, with the vehicle 200 positioned in the transfer area T and the adapter 150 positioned in the charging port 210, the user enters a user information 421 and a plurality of vehicle data 422 into the user interface 420, as shown in FIG. 10. The user information 421 is a user identification, such as the user's name or a user number, user contact information, such as a phone number, an email address, or any other combination or piece of information that would allow identification of a specific user and the mobile device 500 associated with the specific user. In another embodiment, in step 704, the user information 421 and vehicle data 422 can be automatically transmitted from the vehicle 200 to the parking controller 410.

The vehicle data 422 includes, as shown in FIG. 10, a plug-in status 424 of the vehicle 200, a target charge amount 426 of the vehicle 200, and a return time 428 for the vehicle 200. The plug-in status 424 indicates whether the vehicle 200 is capable of being plugged in to charge the battery 220 and, for example, may be a binary "yes" or "no" entry. The target charge amount 426 indicates the user's desired charge level 222 of the battery 220 when the user returns to retrieve the vehicle 200. The target charge amount 426, for example, may be indicated by a percentage. The return time 428 is a time that the user intends to return to retrieve the vehicle 200 from the APS 10. The return time 428 could be a later time on the same day, a later day, or even a longer term.

The user interface 420 transmits the user information 421 and the vehicle data 422 to the parking controller 410 by a wired connection, a wireless connection, near-field communication, or any other type of data connection. In another embodiment, the user interface 420 is omitted, and the user enters the user information 421 and the vehicle data 422 at the mobile device 500, which transmits both to the parking controller 410 though a wired connection, a wireless connection, near-field communication, or any other type of data connection.

The parking controller 410 receives the user information 421 and the vehicle data 422 and, as shown in FIG. 10, stores the user information 421 and the vehicle data 422 in a vehicle entry 440 associated with the vehicle 200 in the stored vehicle database 430. The stored vehicle database 430 contains a plurality of vehicle entries 440, with each of the vehicle entries 440 corresponding to one of the vehicles 200 in the APS 10.

In a step 706 shown in FIG. 11A, the parking controller 410 determines whether the vehicle 200 in the transfer area T is capable of being plugged in to charge a battery 220. The parking controller 410 retrieves the plug-in status 424 of the vehicle 200 from the vehicle data 422 in the vehicle entry 440 stored for the vehicle 200 in the stored vehicle database 430.

If the plug-in status 424 indicates that the vehicle 200 cannot be plugged in during step 706, the charging process 700 proceeds to a step 708. In the step 708 in FIG. 11A, the parking controller 410 communicates with and controls the vehicle relocation system 300 to move the vehicle 200 from the transfer area T to one of the standard storage locations SL, shown in FIGS. 7-9.

After the vehicle 200 has been moved to the standard storage location SL, in a step 710 in FIG. 11A, the parking controller 410 waits for a user retrieval request. In an embodiment, the user inputs the user retrieval request at the user interface 420 corresponding to one of the transfer areas T when the user returns to the APS 10. In another embodiment, the user could enter the user retrieval request on the mobile device 500, which could transmit the user retrieval request to the parking controller 410. In another embodiment, the parking controller 410 could passively receive location data from the mobile device 500 on an interval and could initiate the user retrieval request when the mobile device 500 enters a particular geographic area or geofence around the APS 10.

In step 712, the parking controller 410 determines whether a user retrieval request has been received. If the user retrieval request is not yet received, the parking controller 410 continues to wait in the step 710 and the vehicle 200 remains in the standard storage location SL.

When the parking controller 410 receives the user retrieval request, the parking controller 410 communicates with and controls the vehicle relocation system 300 in a step 714 to move the vehicle 200 from the standard storage location SL to the transfer area T. The user can then retrieve the vehicle 200 from the transfer area T and leave the APS 10.

If the plug-in status 424 indicates that the vehicle 200 can be plugged in during step 706 shown in FIG. 11A, the charging process proceeds to a step 716. In the step 716, the parking controller 410 determines a charge start time 442 for the vehicle 200, shown in FIG. 10. The parking controller 410 retrieves the return time 428 and the target charge amount 426 of the vehicle 200 for each of the vehicle entries 440 in the stored vehicle database 430 that indicate that the vehicle 200 is capable of being plugged in at the plug-in status 424. The parking controller 410 compares the charge start time 442 and the return time 428 for each of the vehicles 200 in the APS 10 that is capable of being plugged in, and determines a charge start time 442 for the newly entered vehicle 200 based on the return time 428 and the target charge amount 426 for each of the vehicles 200 in the APS 10 along with an availability of charging storage locations CL in the APS 10. The charge start time 442 determined by the parking controller 410, a time at which a charging process for the particular vehicle 200 should begin, is stored in the vehicle entry 440 for the vehicle 200 in the stored vehicle database 430.

In a step 717 shown in FIG. 11A, with the vehicle 200 still in the transfer area T, the parking controller 410 retrieves the charge start time 442 of the vehicle 200 from the vehicle entry 440 stored for the vehicle 200 in the stored vehicle database 430. The parking controller 410 compares the charge start time 442 to the current time.

If the charge start time 442 is earlier than or equal to the current time, in a step 718 shown in FIG. 11A, the parking controller 410 communicates with and controls the vehicle relocation system 300 to move the vehicle 200 from the transfer area T to one of the charging storage locations CL, shown in FIGS. 7-9.

If the charge start time 442 is later than the current time, in a step 720 shown in FIG. 11A, the parking controller 410 communicates with and controls the vehicle relocation system 300 to move the vehicle 200 from the transfer area T to one of the standard storage locations SL, shown in FIGS. 7-9.

After the vehicle 200 has been moved to the standard storage location SL, in a step 722 in FIG. 11A, the parking controller 410 retrieves the charge start time 442 of the vehicle 200 from the vehicle entry 440 stored for the vehicle 200 in the stored vehicle database 430, as shown in FIG. 10, and compares the charge start time 442 to the current time on an interval. The interval could be any interval of time measured in milliseconds, seconds, or minutes. In a step 724, if the current time is not yet the charge start time 442, the parking controller 410 continues to compare the times on the interval in the step 722.

If the current time is at or later than the charge start time 442 in the step 724, as shown in FIG. 11A, the parking controller 410 communicates with and controls the vehicle relocation system 300 to move the vehicle 200 from the standard storage location SL to one of the charging storage locations CL, shown in FIG. 7-9.

With the vehicle 200 in the charging storage location CL, whether immediately moved there from the transfer area T or first held in a standard storage location SL, in a step 726 shown in FIG. 11A the parking controller 410 communicates with and controls the charging controller 170 to connect the connector 140 with the adapter port 155 of the adapter 150 positioned in the charging port 210 of the vehicle 200. This process 600 is shown in FIG. 6 and described in detail above with reference to FIGS. 1-5.

Figure 11B:
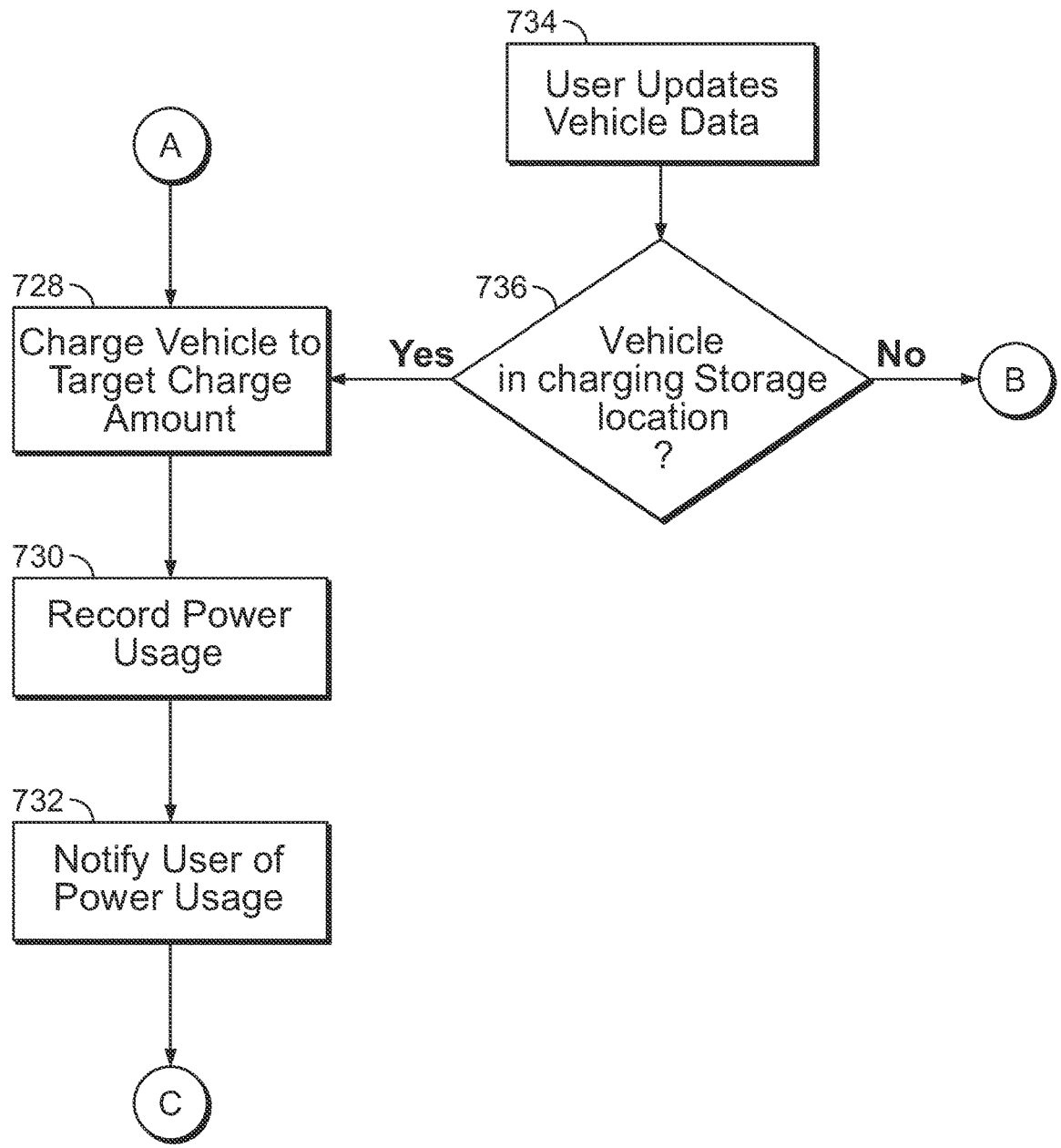
FIG. 11B is a flowchart of a continuation of the charging process in FIG. 11A.

With the connector 140 connected to the adapter 150, as shown in FIG. 4, the parking controller 410 monitors the charge level 222 of the battery 220 of the vehicle 200 in a step 728, shown in FIG. 11B. The parking controller 410 retrieves the target charge amount 426 of the vehicle 200 from the vehicle data 422 in the vehicle entry 440 stored for the vehicle 200 in the stored vehicle database 430. The connector 140 continues to remain electrically connected to the adapter 150, supplying power to the battery 220 through the flexible cable 142 and the connection of the contacts 146, 156, until the parking controller 410 determines that the charge level 222 has reached the target charge amount 426. When the charge level 222 has reached the target charge amount 426, the parking controller 410 communicates with and controls the charging controller 170 to disconnect the connector 140 from the adapter port 155, moving the flexible cable 142 back to the retracted position R shown in FIG. 2.

In a step 730 shown in FIG. 11B, the parking controller 410 records a power usage 444 in charging the vehicle 200 with the charging system 100 in the vehicle entry 440, as shown in FIG. 10. In a step 732 shown in FIG. 11B, the parking controller 410 can optionally notify the user of the power usage 444 by retrieving the power usage 444 from the vehicle entry 440 and communicating the power usage 444 to the mobile device 500 of the user associated with the user information 421 in the vehicle entry 440. The power usage 444 can be communicated to the mobile device 500 wirelessly through an email, a text message, an application on the mobile device 500 associated with the APS 10, or any other form of wireless communication. The power usage 444, as shown in FIG. 10, is also stored in the stored vehicle database 430 in association with the user information 421 for retrieval by an administrator of the APS 10, for example, for later invoicing or usage tracking.

With the vehicle 200 charged to the target charge amount 426 in steps 726-732, the process 700 proceeds to the step 708 shown in FIG. 11A. The parking controller 410 communicates with and controls the vehicle relocation system 300 to move the vehicle 200 to the standard storage location SL, then follows the remaining steps 710-714 to return the vehicle 200 to the transfer area T for the user.

As shown in FIG. 11B, the user can also update the vehicle data 422 remotely while the vehicle 200 is stored in the APS 10 in a step 734. The user enters updated vehicle data 422 on the mobile device 500, which wirelessly communicates with the parking controller 410. The user can update the target charge amount 426 and/or the return time 428. The parking controller 410 stores the updated vehicle data 422 in the vehicle entry 440 particular to the user and the user's vehicle 200.

With the vehicle data 422 updated, in a step 736 shown in FIG. 11B, the parking controller 410 determines whether the vehicle 200 associated with the updated vehicle data 422 received from the user is currently in a charging storage location CL. If the vehicle 200 is not in a charging storage location CL, the parking controller 410 proceeds with the determination in step 716 with updated information, then proceeding through steps 717-732 as described above. If the vehicle 200 is in a charging storage location CL, the parking controller 410 proceeds with the charging 728 with the updated information, then proceeding through steps 730 and 732 as described above.

Figure 12:
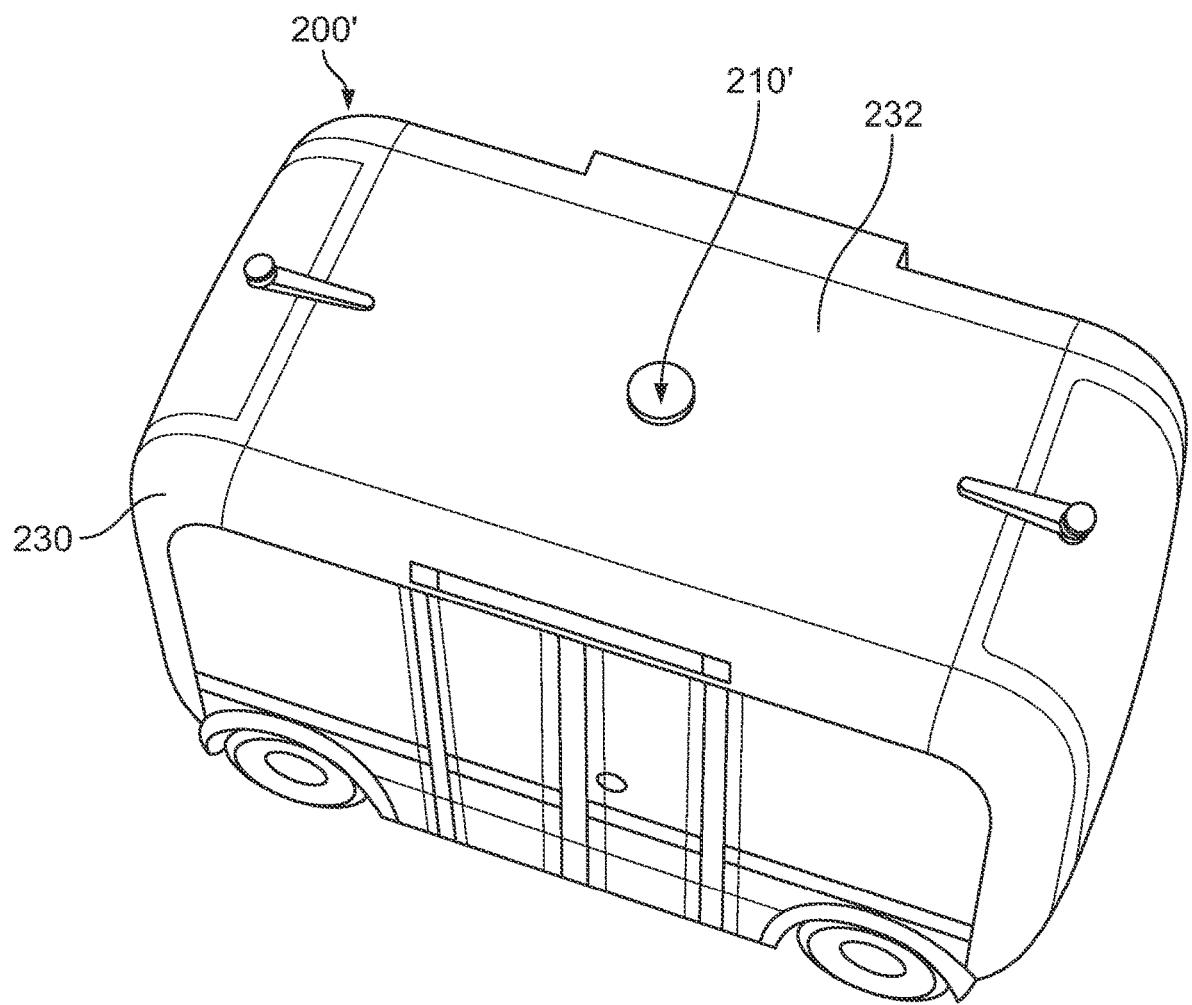
FIG. 12 is a perspective view of a vehicle according to another embodiment.
Figure 13:
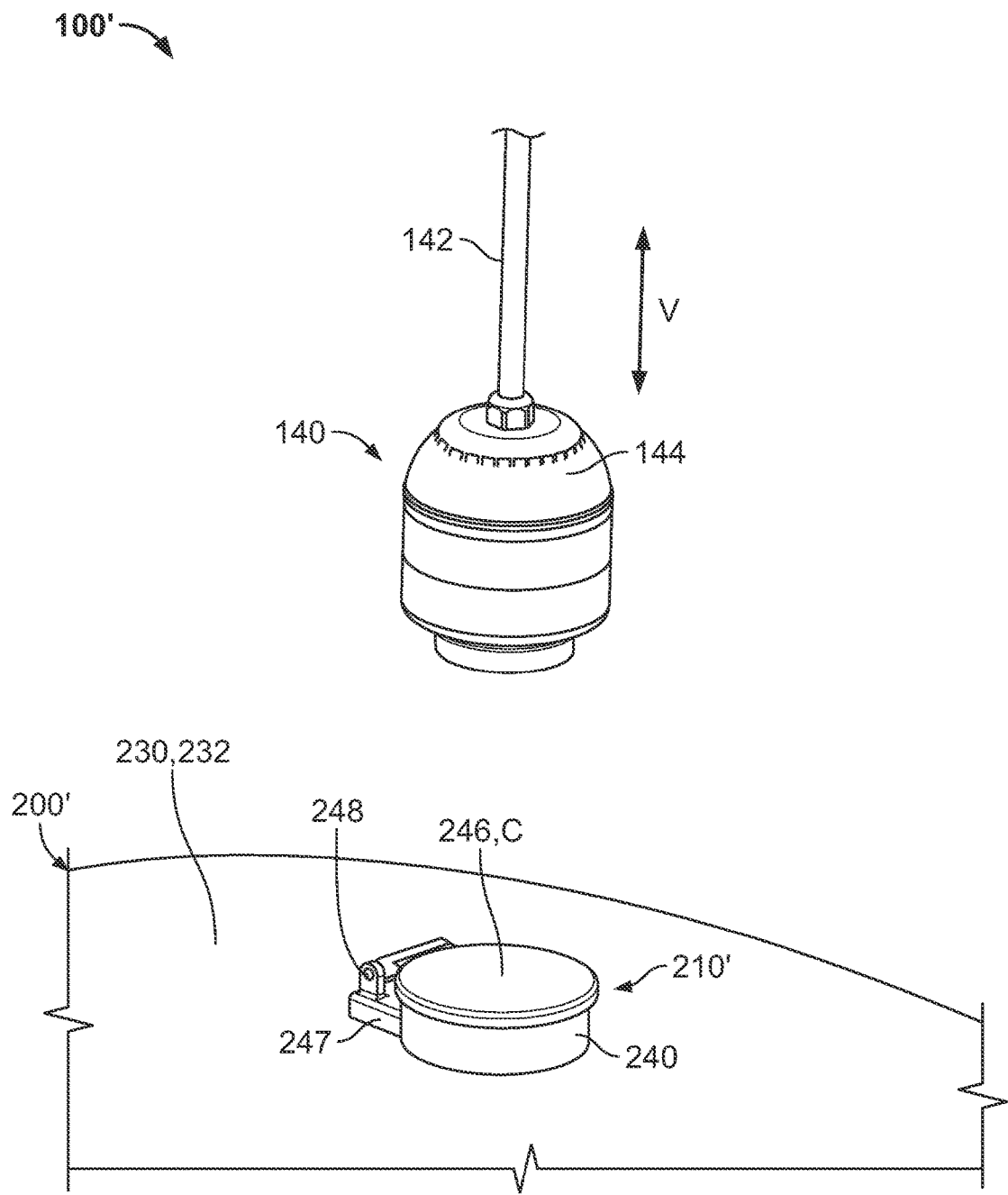
FIG. 13 is a detail perspective view of a charging system according to another embodiment and the vehicle of FIG. 12, with a port cover of a charging port of the vehicle in a closed position.
Figure 14:
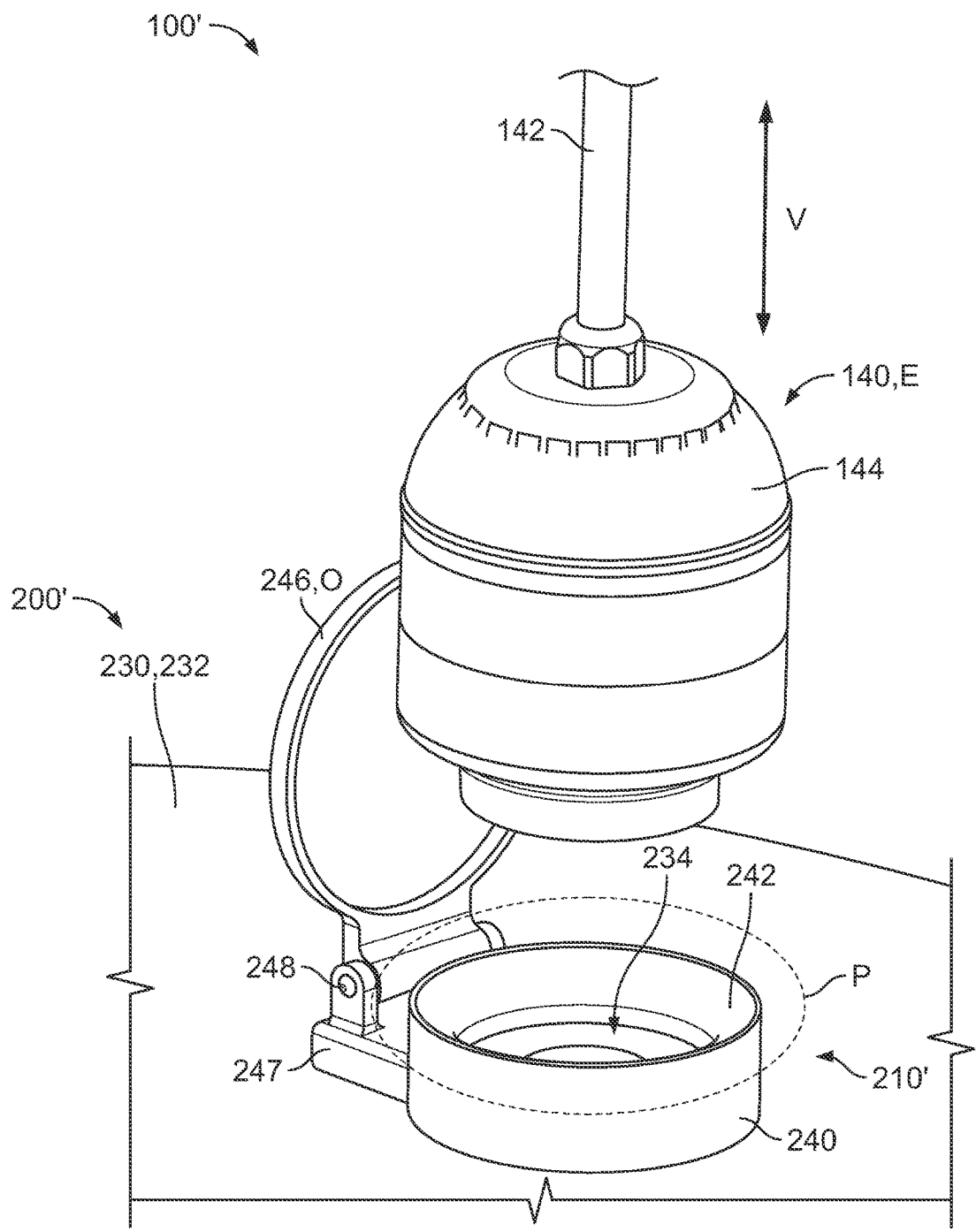
FIG. 14 is a detail perspective view of the charging system of FIG. 13 with the vehicle of FIG. 12, with the port cover in an open position.
Figure 15:
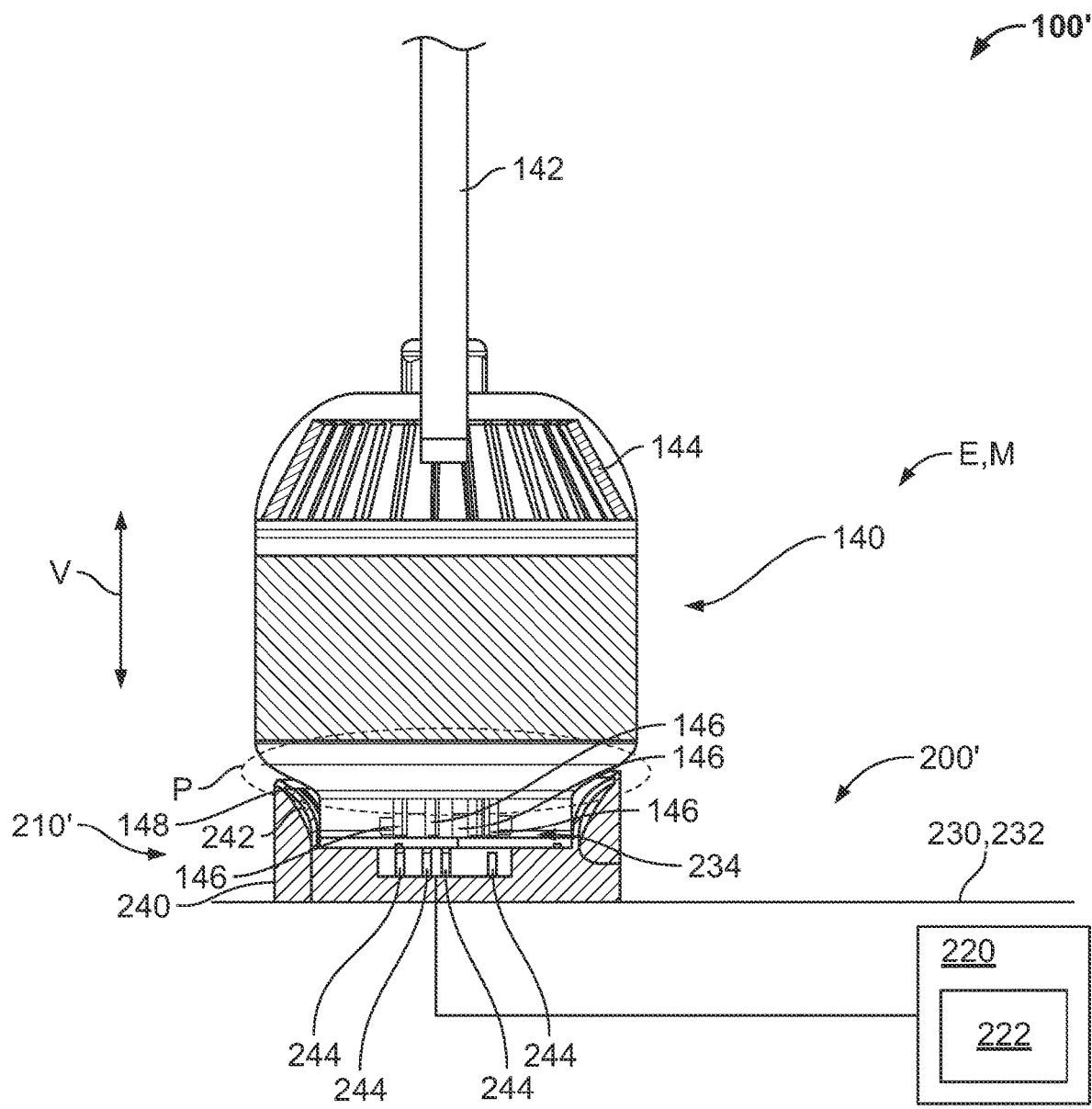
FIG. 15 is a detail sectional side view of the charging system of FIG. 13 with the vehicle of FIG. 12.

A vehicle 200' according to another embodiment, shown in FIG. 12, is chargeable with a charging system 100' according to another embodiment and shown in FIGS. 13-15. In the embodiments described below, like reference numbers refer to like elements with the embodiments shown and described in FIGS. 1-11B. Only the differences of the below embodiments with respect to the embodiments shown and described in FIGS. 1-11B will be described in detail.

The charging system 100' includes the overhead moving system 110, the connector 140, the vision system 160, and the charging controller 170 of the charging system 100 described in detail above. In lieu of the adapter 150 of the charging system 100 described above, the charging system 100' includes a charging port 210' of the vehicle 200' described in detail below.

The vehicle 200', as shown in FIG. 12, has a body 230 with a roof 232. A charging port 210' according to another embodiment different from the charging port 210 is fixed on the body 230 of the vehicle 200' and is accessible from an exterior of the vehicle 200'. In the shown embodiment, the charging port 210' is fixed to the roof 232 of the vehicle 200', approximately centrally on the roof 232. In other embodiments, the charging port 210' can be fixed elsewhere on the roof 232, or elsewhere on the body 230 of the vehicle 200'. The vehicle 200' is an autonomous or driverless vehicle, as will be described in greater detail below, and may also be referred to as an autonomous vehicle 200' herein.

The charging port 210', as shown in FIGS. 13-15, has a port housing 240 and a plurality of second contacts 244 disposed in the port housing 240. The port housing 240 is secured to the body 230 of the vehicle 200'. In the shown embodiment, the port housing 240 is secured to the roof 232 of the body 230 and protrudes from the roof 232, beyond an outer surface of the roof 232, along the vertical axis V. In another embodiment, the port housing 240 could be secured to the body 230 and recessed into the body 230, for example, with an outermost surface of the port housing 240 positioned flush with the roof 232.

As shown in FIGS. 14 and 15, at an end of the port housing 240 opposite the roof 232 along the vertical axis V, the port housing 240 has a second alignment element 242. The second alignment element 242 of the charging port 210' is similar to the second alignment element 158 of the adapter port 155 in the embodiment shown in FIG. 4. In the embodiment shown in FIGS. 14 and 15, the second alignment element 242 is a shaped profile of the port housing 240. In the shown embodiment, the second alignment element 242 has a curved, approximately funnel shaped profile. In other embodiments, the second alignment element 242 could be a magnet disposed within the port housing 240, or could be any element or any combination of elements that contribute to positioning the connector 140 in the mating alignment orientation in the port housing 240 as described in greater detail below.

The plurality of second contacts 244, as shown in FIG. 14, are disposed in the port housing 240 at a bottom of a receiving recess 234 defined by the port housing 240 and the second alignment element 242. The second contacts 244 are electrical contact elements that are electrically connected to the battery 220 of the vehicle 200'.

In the embodiment shown in FIGS. 13 and 14, the charging port 210' has a port cover 246 that is attached to the port housing 240 at a hinge 248. The port cover 246 is pivotable about the hinge 248 between an open position O, shown in FIG. 14, and a closed position C, shown in FIG. 13. In the closed position C, the port cover 246 encloses the port housing 240 and covers the second contacts 244 within the port housing 240. In an embodiment, the port cover 246 can form a weather-tight seal with the port housing 240 in the closed position C.

In the shown embodiment, the port cover 246 is rotatable about the hinge 248 between the open position O and the closed position C. In other embodiments, the port cover 246 could be attached to the port housing 240 and movable in a linear manner with respect to the port housing 240 between the open position O and the closed position C, or could be movable in any direction and in any other manner between the open position O and the closed position C. In another embodiment, as shown in FIG. 15, the port cover 246 can be omitted.

In the embodiment shown in FIGS. 13 and 14, the port cover 246 is connected to a cover drive 247 disposed within the port housing 240. The cover drive 247 is controllable by a vehicle controller 252, as described in greater detail below, to move the port cover 246 between the open position O and the closed position C. The cover drive 247 can be any element capable of rotating the port cover 246 about the hinge 248 or, in another embodiment, moving the port cover 246 linearly with respect to the port housing 240. In another embodiment, the cover drive 247 can be omitted, and the port cover 246 can be manually moved between the open position O and the closed position C.

Figure 16:
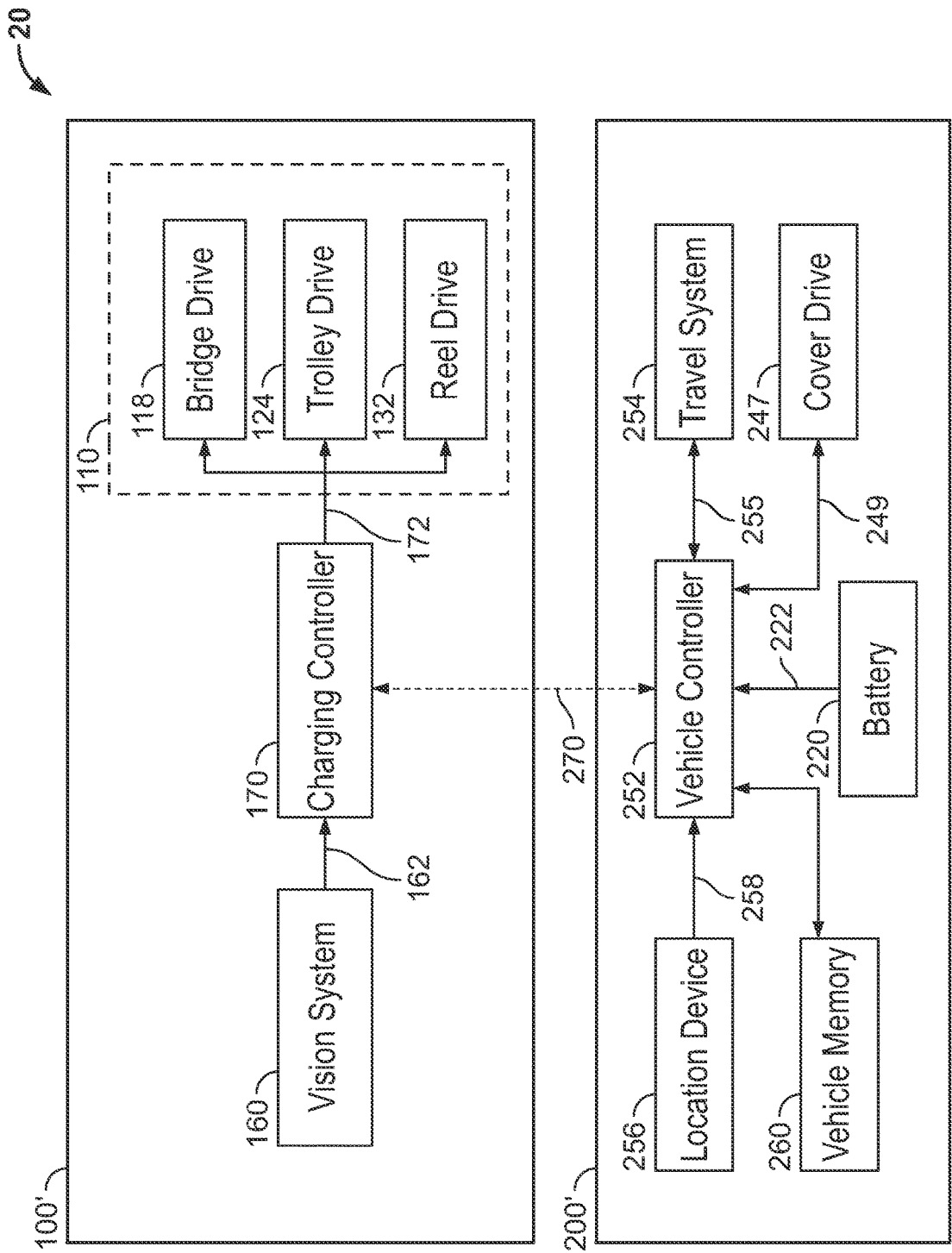
FIG. 16 is a block diagram of a charging arrangement according to an embodiment including the charging system of FIG. 13 and the vehicle of FIG. 12.

FIG. 16 is a block diagram of a charging arrangement 20 according to an embodiment, the charging arrangement 20 including the charging system 100' and the vehicle 200' charged by the charging system 100'.

The vehicle 200', as shown in FIG. 16, includes a vehicle controller 252 having a processor and a plurality of instructions stored on a non-transitory computer readable medium that, when executed by the processor, perform the functions of the vehicle controller 252 described herein. The vehicle controller 252 is connected to and capable of communicating with a travel system 254, a location device 256, a vehicle memory 260, the cover drive 247, and the battery 220 all disposed within the vehicle 200'. The elements connected to the vehicle controller 252 shown in FIG. 16 and described herein are not intended to be exhaustive but rather only illustrate elements of the vehicle 200' necessary for the description of the present invention; the vehicle controller 252 may be connected to, communicate with, and be capable of controlling other elements in the vehicle 200'.

The travel system 254, shown in FIG. 16, includes at least the wheels, the engine, the steering system, and the brakes of the vehicle 200'. The travel system 254 exchanges movement data 255 with the vehicle controller 252. Movement data 255 sent from the vehicle controller 252 to the travel system 254 moves the vehicle 200', via at least the wheels, the engine, the steering, and the brakes, according to the instructions contained within the movement data 255. The travel system 254 also sends movement data 255 back to the vehicle controller 252 to update the vehicle controller 252 on movements executed by the travel system 254. The travel system 254 may be any type of system, and may control any number of components of the vehicle 200', that allows the vehicle 200' to operate as an autonomous or driverless vehicle under the control of the vehicle controller 252.

The location device 256, shown in FIG. 16, sends a location data 258 to the vehicle controller 252 representing a geographical location of the vehicle 200'. The location device 256, in various embodiments, can be a global navigation satellite system (GNSS), such as a global positioning system (GPS), an inertial measurement unit (IMU), a light detection and ranging (LIDAR) device, any combination thereof, or any other type of location or position determination used in autonomous vehicles.

The vehicle memory 260, shown in FIG. 16, is a non-transitory computer readable medium storing a plurality of data related to the vehicle 200'. The vehicle memory 260, for example, can store the user information 421 for the user associated with the vehicle 200' and the vehicle data 422 described above, and can store any other information related to the vehicle 200' that can be used by the vehicle controller 252 to perform the functions described herein.

The vehicle controller 252 is connected to the cover drive 247 in an embodiment in which the charging port 210' has the port cover 246. As shown in FIG. 16, the vehicle controller 252 sends a cover instruction 249 to the cover drive 247 to actuate the cover drive 247 as necessary to move the port cover 246 between the open position O and the closed position C.

The vehicle controller 252 is connected to the battery 220 of the vehicle 200' and, as shown in FIG. 16, receives the charge level 222 of the battery 220. The vehicle controller 252 can store the charge level 222 in the vehicle memory 260 and update the charge level 222 stored in the vehicle memory 260 as the charge level 222 is received from the battery 220.

A charging process 800 of the charging arrangement 20 automatically charging the autonomous vehicle 200' located in the charging storage location CL with the charging system 100' will now be described in greater detail primarily with reference to FIG. 17.

In the embodiment of the charging system 100 described with respect to FIGS. 1 and 2, the charging system 100 is capable of moving the connector 140 along the first horizontal axis H1 with the bridge drive 118, along the second horizontal axis H2 with the trolley drive 124, and along the vertical axis V with the reel drive 132. In the embodiment of the charging process 800 shown in FIG. 17, by contrast, the charging system 100' is movable along the vertical axis V and at most one of the first horizontal axis H1 and the second horizontal axis H2. In the charging system 100', the overhead moving system 110 has the cable reel 130 with the reel drive 132 to wind or unwind the flexible cable 142 and move the connector 140 along the vertical axis V, but the overhead moving system 110 omits one or both of the bridge drive 118 and the trolley drive 124, and the corresponding support rails 112 and/or bridge rails 116. The charging system 100' in the embodiment of the charging process 800, for example, may be capable of moving the connector 140 only along the vertical axis V, may be capable of moving the connector 140 along the vertical axis V and the first horizontal axis H1, or may be capable of moving the connector 140 along the vertical axis V and the second horizontal axis H2.

Figure 17:
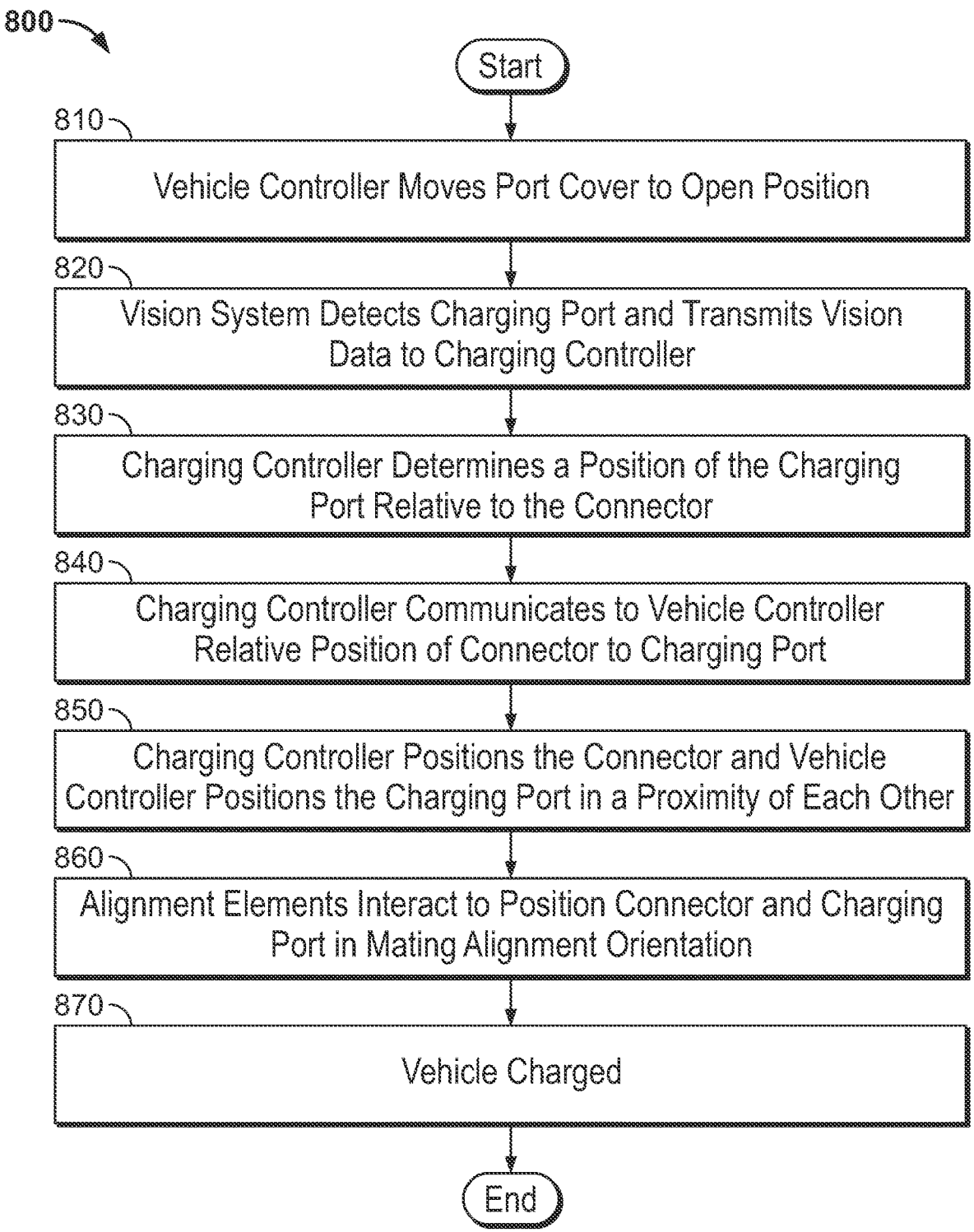
FIG. 17 is a flowchart of a charging process of charging the vehicle of FIG. 12 with the charging system of FIG. 13.

In a first step 810 shown in FIG. 17, the vehicle controller 252 sends the cover instruction 249 to the cover drive 247 to move the port cover 246 from the closed position C shown in FIG. 13 to the open position O shown in FIG. 14. In another embodiment in which the port cover 246 is omitted, as shown in FIG. 15, the first step 810 is not performed.

In a step 820, shown in FIG. 17, the vision system 160 detects the charging port 210' fixed to the body 230 of the vehicle 200'. The charging port 210' is in a field of view of the vision system 160 that faces the ground surface G and the charging storage location CL, as shown in FIGS. 2 and 3 and described above. The vision system 160, as shown in FIG. 16, transmits a vision data 162 to the charging controller 170 representative of the field of view including the charging port 210'. The vision data 162 may be an image or any other type of data representative of the field of view of the vision system 160.

The charging controller 170, in a step 830 shown in FIG. 17, receives the vision data 162 from the vision system 160. The charging controller 170, by execution of the processor, locates the charging port 210' within the vision data 162 and determines a position of the charging port 210' relative to the connector 140 along the first horizontal axis H1, the second horizontal axis H2, and the vertical axis V shown in FIG. 1.

As shown in FIG. 16, the charging controller 170 is capable of exchanging a charging position data 270 with the vehicle controller 252. The communication between the charging controller 170 and the vehicle controller 252 can take place via a wireless connection, near-field communication, or any other type of data connection. In a step 840, the charging controller 170 communicates the charging position data 270 to the vehicle controller 252, the charging position data 270 representing the position of the charging port 210' relative to the connector 140 along the first horizontal axis H1, the second horizontal axis H2, and the vertical axis V and based on the vision data 162 processed by the charging controller 170.

Based on the charging position data 270, in a step 850 shown in FIG. 17, the charging controller 170 cooperates with the vehicle controller 242, via the exchange of the charging position data 270, to position the connector 140 in a proximity P of the charging port 210' shown in FIGS. 14 and 15.

In another embodiment, the vision system 160 is omitted in step 820 and the charging controller 170 does not receive the vision data 162 in the step 830. In this embodiment, the charging position data 270 representing the position of the charging port 210' relative to the connector 140 is based on a comparison of a known position of the connector 140 along the first horizontal axis H1, the second horizontal axis H2, and the vertical axis V stored in the charging controller 170 to a position of the charging port 210' determined and received via the location device 256 of the vehicle 200'.

In the step 850, in an embodiment in which the overhead moving system 110 is only capable of moving the connector 140 along the vertical axis V, the vehicle controller 242 sends movement data 255 to the travel system 254 instructing the travel system 254 to position the charging port 210' along the first horizontal axis H1 and the second horizontal axis H2 under the connector 140 based on the charging position data 270. The charging controller 170 transmits the drive control signals 172 to control the reel drive 132 to rotate the cable reel 130. As described in the embodiment above, the connector 140 is movable along the vertical axis V by rotation of the cable reel 130, unwinding the flexible cable 142 and moving the connector 140 to the extended position E in the proximity P of the charging port 210' as shown in FIG. 14.

In an embodiment in which the overhead moving system 110 is capable of moving the connector 140 along the vertical axis V and one of the first horizontal direction H1 and the second horizontal direction H2, in the step 850, the vehicle controller 242 sends movement data 255 to the travel system 254 instructing the travel system 254 to position the charging port 210' along the one of the first horizontal axis H1 and the second horizontal axis H2 along which the overhead moving system 110 cannot move the connector 140. Along the other of the first horizontal axis H1 and the second horizontal axis H2, the vehicle controller 242 controls the travel system 254 in cooperation with the charging controller 170 controlling one of the bridge drive 118 and the trolley drive 124 to position the charging port 210' under the connector 140. The charging controller 170 then transmits the drive control signals 172 to control the reel drive 132 to rotate the cable reel 130 and move the connector 140 along the vertical axis V in the proximity P of the charging port 210' as shown in FIG. 14.

In the step 860, shown in FIG. 17, the first alignment element 148 of the connector 140 interacts with the second alignment element 242 of the port housing 240 to position the connector 140 in a mating alignment orientation with respect to the port housing 240 from the proximity P. In the embodiment shown in FIG. 15, for example, the outer profile of the connector housing 144 serving as the first alignment element 148 abuts the profile of the port housing 240 serving as the second alignment element 242 to properly position the connector 140 with respect to the charging port 210' in the mating alignment orientation, allowing further movement of the connector 140 along the vertical axis V to a mated position M with the charging port 210', as shown in FIG. 15.

In an embodiment, in the step 860, the first alignment element 148 and the second alignment element 242 position the connector 140 along the first horizontal axis H1, the second horizontal axis H2, and the vertical axis V from the proximity P to the mating alignment orientation. In other embodiments, for example if the alignment elements 148, 242 are magnets, the alignment elements 148, 242 may also properly position the connector 140 in a rotational orientation about the vertical axis V as part of the mating alignment orientation. In other embodiments, the vehicle controller 252 and the charging controller 170 can cooperate to move the connector 140 into the mated position M in the charging port 210' in the mating alignment orientation without the use of the first alignment element 148 and the second alignment element 242.

In all embodiments, the movement of the overhead system 110 controlled by the charging controller 170 and the movement of the vehicle 200' via the travel system 254 in steps 850 and 850 automatically positions the connector 140 in the mating alignment orientation and the mated position M in the charging port 210', as shown in FIG. 15. In the mated position M, the first contacts 146 are electrically connected with the second contacts 244. In a step 870 shown in FIG. 17, the flexible cable 142 conducts an electrical supply that passes through the connected contacts 146, 244 and to the battery 220 of the vehicle 200' to charge the battery 220.

The process 800 shown in FIG. 17 describes the executed controls leading to the electrical connection of the connector 140 with the charging port 210' when the autonomous vehicle 200' is already positioned in the charging storage location CL. In a charging arrangement 30 according to another embodiment, described in greater detail below with respect to FIGS. 18, 19A, and 19B, the charging storage location CL having the charging system 100' is part of the APS 10 and the autonomous vehicle 200' moves to the charging storage location CL prior to starting the process 800 shown and described with respect to FIG. 17. The charging arrangement 30 includes the APS 10 having the charging system 100', the vehicle 200', and the mobile device 500 described above.

In an embodiment, the APS 10 is a surface parking lot including at least one charging storage location CL and any number of standard storage locations SL. In another embodiment, the APS 10 used with the autonomous vehicle 200' in the charging arrangement 30 is the same as shown in FIGS. 7-9 and used in the embodiment with the vehicle 200, including the transfer area T and the vehicle relocation system 300. In another embodiment, the APS 10 of the charging arrangement 30 is a conventional parking garage with standard storage locations SL and charging storage locations CL, omitting the transfer area T and having conventional ramps between the levels L1, L2, L3 . . . Ln instead of the vehicle relocation system 300. The distribution of the standard storage locations SL and charging storage locations CL, however, is the same as shown and described with respect to FIGS. 7-9 for all embodiments.

Figure 18:
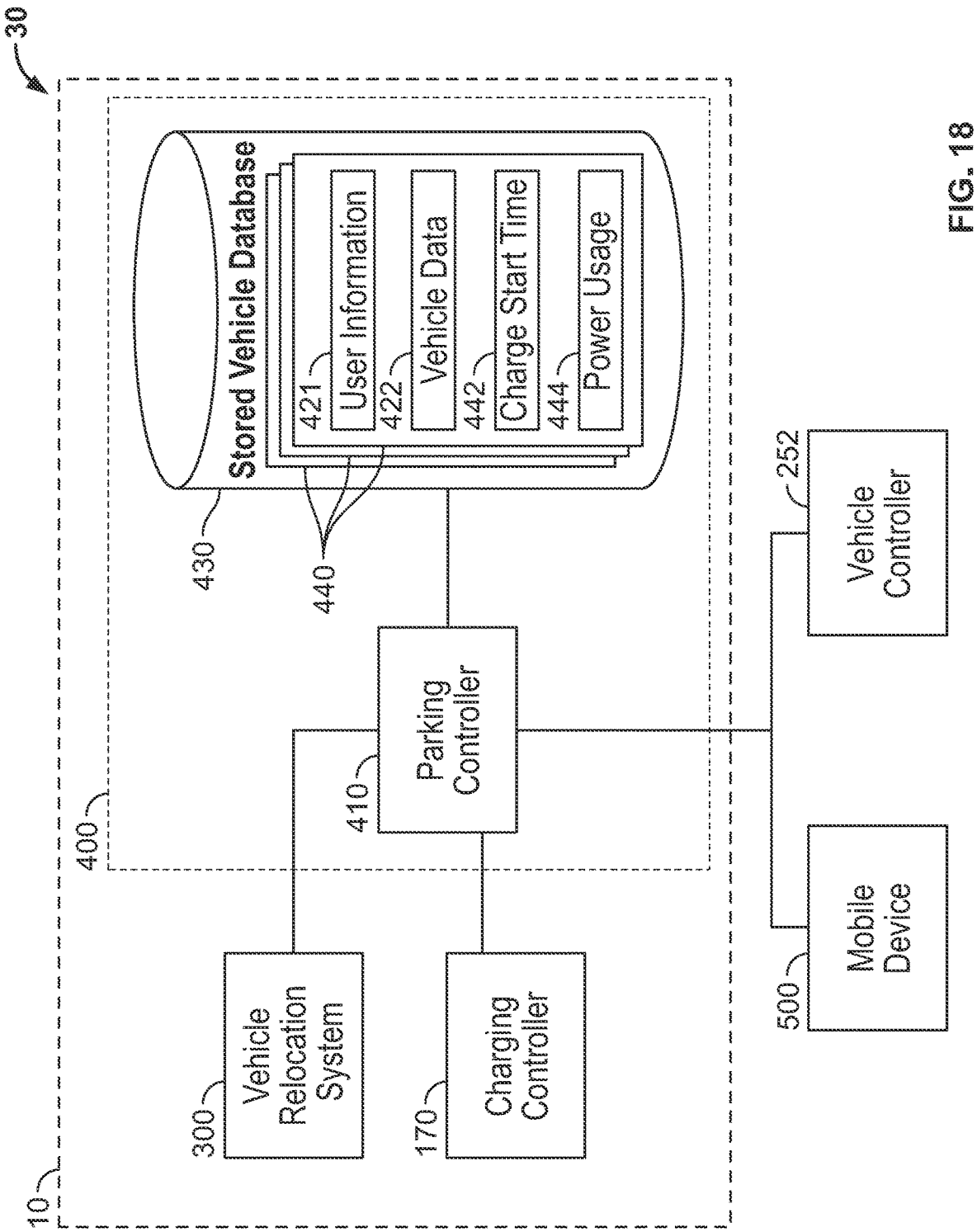
FIG. 18 is block diagram of a charging arrangement according to another embodiment with an automated parking system.

In the embodiment of the APS 10 used with the autonomous vehicle 200' in the charging arrangement 30, shown in FIG. 18, the APS 10 has the parking control system 400 described above connected to the charging controller 170, or multiple charging controllers 170, associated with the charging storage locations CL in the APS 10. In an embodiment, the APS 10 includes the vehicle relocation system 300 and the parking control system 400 is connected to the vehicle relocation system 300. In the parking control system 400 shown in FIG. 18 used with the autonomous vehicle 200', as compared to the embodiment shown in FIG. 10 used with the vehicle 200, the user interface 420 is unnecessary. In the APS 10 associated with the autonomous vehicle 200', the user interface 420 described in the above embodiments may be omitted entirely or may be simply unused.

As shown in FIG. 18, as part of the charging arrangement 30, the mobile device 500 and the vehicle controller 252 are connected to the parking controller 410 and to each other. The mobile device 500 and the vehicle controller 252 are connected to the parking controller 410 by a wireless connection, near-field communication, or any other type of data connection. The mobile device 500 and the vehicle controller 252 are connected to each other by a wired connection, a wireless connection, near-field communication, or any other type of data connection.

A charging process 900 of the charging arrangement 30 automatically charging the autonomous vehicle 200' in the APS 10 will now be described in greater detail primarily with reference to FIGS. 19A and 19B. In the embodiment shown in FIGS. 18, 19A, and 19B, and referenced in the charging process 900 below, some of the autonomous vehicles 200' using the APS 10 are not be capable of being plugged in to charge a battery 220.

Figure 19A:
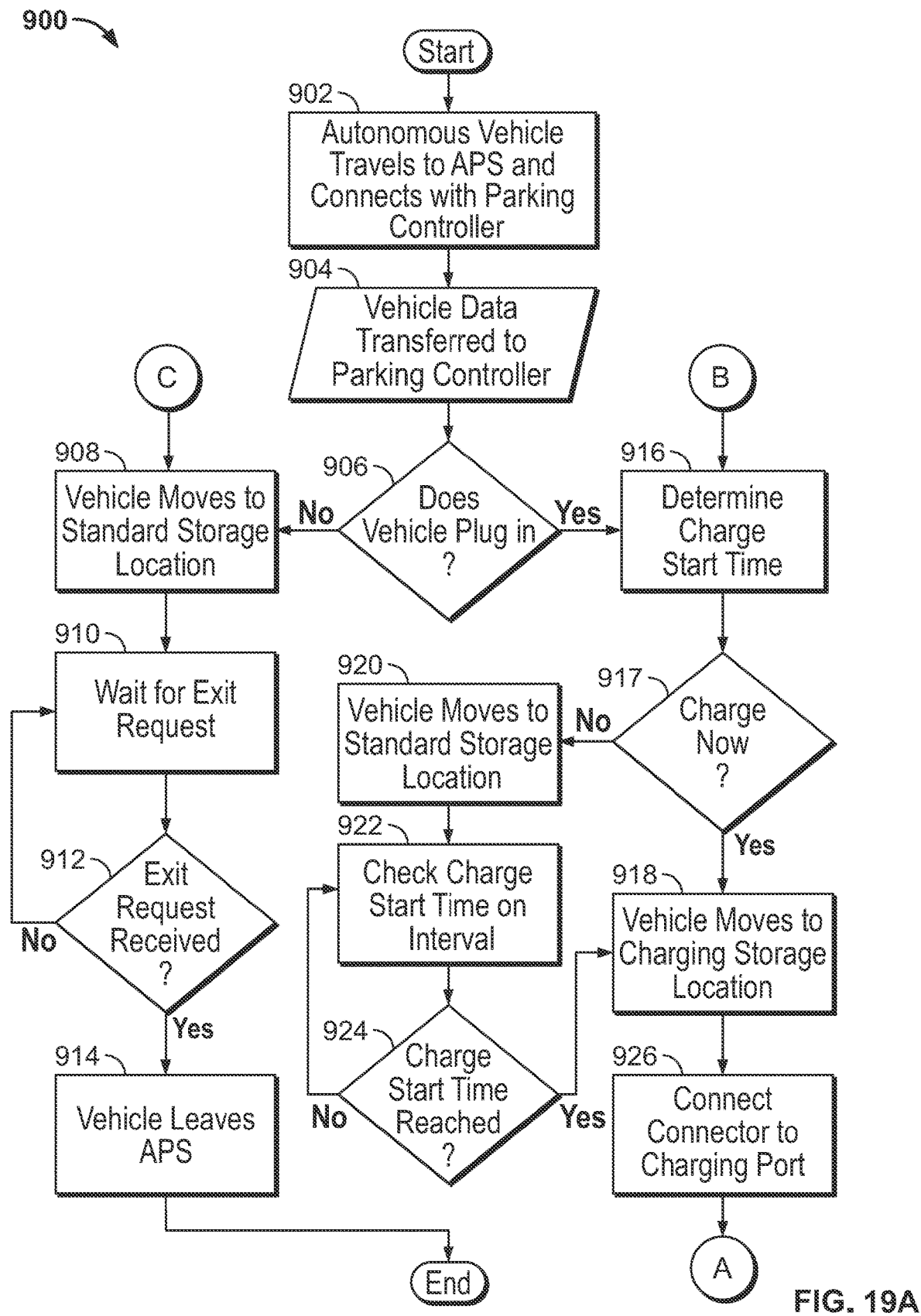
FIG. 19A is a flowchart of a charging process of charging the vehicle of FIG. 12 with the automated parking system of FIG. 18.

The charging process 900 starts, in a step 902 shown in FIG. 19A, with the autonomous vehicle 200' traveling to the APS 10 from a remote location. The autonomous vehicle 200' could, for example, use the vehicle controller 252 to monitor the charge level 222 and determine when it is necessary to charge the battery 220. The vehicle controller 252, optionally considering when the vehicle 200' is not in use according to a schedule of the user stored in the mobile device 500, such as if the user intends to be at work, home, or another location for an extended period, could then send movement data 255 to the travel system 254 to move the vehicle 200' to the APS 10 to continue the charging process 900 shown in FIGS. 19A and 19B or to move the vehicle

200' to another charging storage location CL outside of an APS 10 to perform the charging process 800 shown in FIG. 17.

In the step 902 shown in FIG. 19A, the vehicle controller 252 of the autonomous vehicle 200' connects with the parking controller 410 of the APS 10 when the vehicle controller 252 is in communication range of the parking controller 410. In an embodiment, the initial connection of the parking controller 410 with the vehicle controller 252 occurs when the vehicle 200' is still outside of the APS 10.

In a step 904 shown in FIG. 19A, the vehicle data 422 and the user information 421 are sent to the parking controller 410. The vehicle data 422 and the user information 421, if stored on the vehicle memory 260, can be sent to the parking controller 410 by the vehicle controller 252 when the vehicle controller 252 connects to the parking controller 410. In another embodiment, at least some of the vehicle data 422 and the user information 421 is sent to the parking controller 410 from the mobile device 500. In various embodiments, the user information 421 and the vehicle data 422 is sent to the parking controller 410 by one or both of the vehicle controller 252 and the mobile device 500. The parking controller 410 receives the user information 421 and the vehicle data 422 and, as shown in FIG. 18, stores the user information 421 and the vehicle data 422 in a vehicle entry 440 associated with the vehicle 200' in the stored vehicle database 430. In the embodiment of the autonomous vehicle 200', the return time 428 indicates a time that the vehicle 200' needs to be back at the user, and accounts for the time requires to return to the user from the APS 10.

Based on the plug-in status 424 included in the vehicle data 422, the parking controller 410 determines in a step 906 whether the vehicle 200' is capable of being plugged in to charge a battery 220.

If the plug-in status 424 indicates that the vehicle 200' cannot be plugged in during step 906, the charging process 900 proceeds to a step 908, in which the vehicle 200' moves to a standard storage location SL. In an embodiment in which the APS 10 includes the transfer area T and the vehicle relocation system 300, the parking controller 410 communicates with and controls the vehicle relocation system 300 to move the vehicle 200' from the transfer area T to one of the standard storage locations SL, shown in FIGS. 7-9. In another embodiment in which the APS 10 is structured as a conventional parking garage with no transfer area T and ramps instead of the vehicle relocation system 300, the parking controller 410 sends location instructions corresponding to the standard storage location SL to the vehicle controller 252, which sends movement instructions 255 to the travel system 254 to move the vehicle 200' within the APS 10 to the standard storage location SL.

After the vehicle 200' has moved to the standard storage location SL, in a step 910 in FIG. 19A, the parking controller 410 waits for an exit request. In an embodiment, the vehicle controller 252 sends the exit request based on the return time 428. In another embodiment, the user could enter the exit request on the mobile device 500, which could transmit the exit request to the parking controller 410. In another embodiment, the parking controller 410 could passively receive location data from the mobile device 500 on an interval and could initiate the exit request when the mobile device 500 enters a particular geographic area or a geofence around the APS 10.

In a step 912 shown in FIG. 19A, the parking controller 410 determines whether the exit request has been received. If the exit request is not yet received, the parking controller 410 continues to wait in the step 910 and the vehicle 200' remains in the standard storage location SL.

When the parking controller 410 receives the exit request, in a step 914 in FIG. 19A, the vehicle 200' leaves the APS 10. In an embodiment, the parking controller 410 communicates with and controls the vehicle relocation system 300 in the step 914 to move the vehicle 200' from the standard storage location SL to the transfer area T, after which the vehicle 200' can use the travel system 254 to travel to the appropriate remote location. In another embodiment, in the step 914, the vehicle 200' uses the travel system 254 to move directly from the standard storage location SL out of the APS 10 and to the appropriate remote location.

If the plug-in status 424 indicates that the autonomous vehicle 200' can be plugged in during step 906 shown in FIG. 19A, the charging process 900 proceeds to a step 916. The step 916 operates identically to the step 716 shown in FIG. 11A and described above to determine the charge start time 442. In the step 917, the parking controller 410 compares the charge start time 442 to the current time.

If the charge start time 442 is earlier than or equal to the current time, in a step 918 shown in FIG. 19A, the vehicle 200' moves to one of the charging storage locations CL. If the charge start time 442 is later than the current time, the vehicle 200' moves to the standard storage location SL in a step 920. Throughout the charging process 900, all steps in which the vehicle 200' moves within the APS 10 can be accomplished with two different embodiments. In an embodiment, the parking controller 410 can control the vehicle relocation system 300 to move the autonomous vehicle 200' between the transfer area T, the standard storage locations SL, and the charging storage locations CL. In another embodiment, the parking controller 410 can communicate location instructions to the vehicle controller 252, which controls the travel system 254 to move the autonomous vehicle 200' between the standard storage locations SL and the charging storage locations CL. These embodiments apply to steps 908, 914, 918, and 920.

If the vehicle 200' is moved to the standard storage location SL in step 920, the steps 922 and 924 are performed by the parking controller 410 identically to the steps 722 and 724, respectively, shown in FIG. 11A and described in detail above. In a step 926 shown in FIG. 19A, with the vehicle 200' in the charging storage location CL, the parking controller 410 communicates with and controls the charging controller 170 to connect the connector 140 with the charging port 210' of the vehicle 200'. This process 800 is shown in FIG. 17 and described in detail above.

Figure 19B:
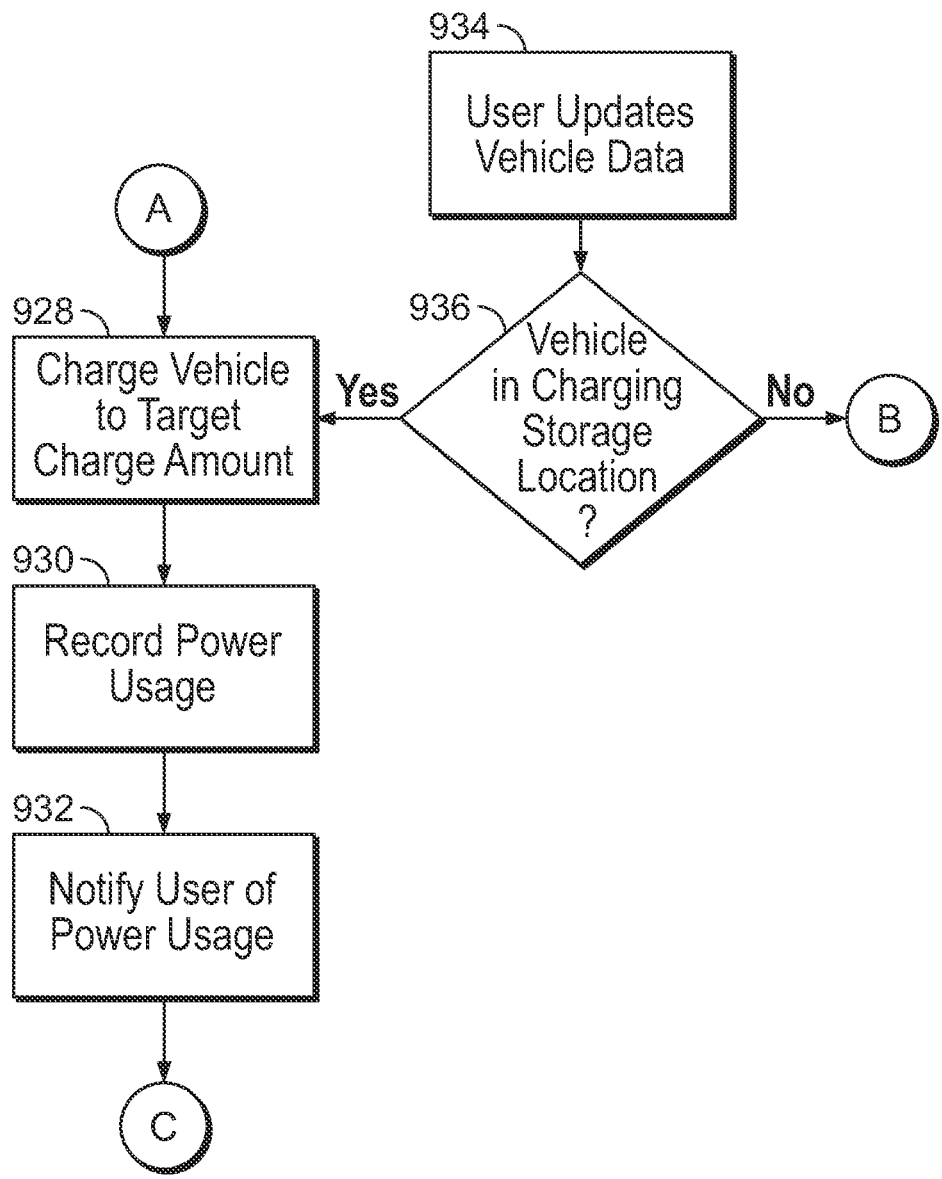
FIG. 19B is a flowchart of a continuation of the charging process in FIG. 19A.

With the connector 140 connected to the charging port 210', as shown in FIG. 15, the parking controller 410 monitors the charge level 222 of the battery 220 in a step 928, shown in FIG. 19B. The parking controller 410 retrieves the target charge amount 426 of the vehicle 200' from the vehicle data 422 in the vehicle entry 440. The connector 140 continues to remain electrically connected to the charging port 210' until the parking controller 140 determines that the charge level 222 transmitted from the vehicle controller 252 has reached the target charge amount 426. When the charge level 222 has reached the target charge amount 426, the parking controller 410 communicates with and controls the charging controller 170 to disconnect the connector 140 from the charging port 210', moving the flexible cable 142 back to the retracted position R.

The steps 930 and 932 shown in FIG. 19B are performed by the parking controller 410 identically to the steps 730 and 732, respectively, shown in FIG. 11B and described in detail above. Likewise, the steps 934 and 936 operate identically to the steps 734 and 736, respectively, shown in FIG. 11B with updating the vehicle data 422. In the step 736, if the vehicle 200' is not in a charging storage location CL, the parking controller 410 proceeds with the determination in step 916 with updated information, then proceeding through steps 917-932 as described above. If the vehicle 200' is in a charging storage location CL, the parking controller 410 proceeds with the charging 928 with the updated information, then proceeding through steps 930 and 932.

What is claimed is:

1. A charging arrangement, comprising:
   a vehicle having a vehicle controller; and
   an automated parking system including a parking controller and a charging storage location having a charging system, the charging system having a charging controller, a connector suspended on a flexible cable and movable along at least one of a plurality of axes perpendicular to one another under control of the charging controller, and a charging port fixed to the vehicle, the vehicle controller communicates with the parking controller to move the vehicle from a standard storage location that does not have the charging system to the charging storage location having the charging system, the standard storage location and the charging storage location are similarly sized in at least two dimensions, the charging controller communicates with the vehicle controller to move the connector into a mated position with the charging port in the charging storage location.

2. The charging arrangement of claim 1, wherein the vehicle has a travel system connected to the vehicle controller, the travel system controls a position of the vehicle based on a movement data from the vehicle controller to move the charging port to the mated position within the charging storage location.

3. The charging arrangement of claim 2, wherein the vehicle controller communicates with the parking controller to move the vehicle between the charging storage location and the standard storage location based on a vehicle data of the vehicle.

4. The charging arrangement of claim 3, wherein the vehicle data includes a target charge amount and a return time, the parking controller determines a charge start time for the vehicle at which the vehicle moves to the charging storage location based on the target charge amount and the return time.

5. The charging arrangement of claim 4, wherein the vehicle controller determines when to leave the automated parking system using the travel system based on the return time.

6. The charging arrangement of claim 1, wherein the charging port is fixed to a roof of the vehicle.

7. The charging arrangement of claim 6, wherein the charging port has a port housing fixed to the roof of the vehicle and protruding from the roof of the vehicle.

8. The charging arrangement of claim 7, further comprising an overhead moving system connected to the flexible cable and the connector, the overhead moving system moves the connector along a vertical axis of the plurality of axes.

9. The charging arrangement of claim 8, wherein the overhead moving system includes a cable reel, the flexible cable is wound around the cable reel.

10. The charging arrangement of claim 9, wherein the cable reel is rotatable to move the connector between a retracted position distal from the charging port and an extended position proximal to the charging port along the vertical axis.

11. The charging arrangement of claim 8, wherein the overhead moving system moves the connector along one of a first horizontal axis and a second horizontal axis of the plurality of axes, the first horizontal axis and the second horizontal axis perpendicular to the vertical axis.

12. The charging arrangement of claim 7, wherein the charging port is electrically connected to a battery of the vehicle.

13. The charging arrangement of claim 12, wherein the connector has a first alignment element, and the port housing has a second alignment element, the first alignment element and the second alignment element position the connector in a mating alignment position with respect to the charging port when in a proximity of the charging port.

14. The charging arrangement of claim 12, wherein the charging port has a port cover attached to the port housing.

15. The charging arrangement of claim 14, wherein the charging port has a cover drive, the port cover is movable with respect to the port housing between an open position and a closed position by the cover drive.

16. The charging arrangement of claim 2, wherein the charging system includes an overhead moving system moving the connector along the at least one of the plurality of axes into the mated position based on a drive control signal from the charging controller.

17. The charging arrangement of claim 16, wherein the charging system has a vision system connected to the charging controller and transmitting a vision data representative of a field of view including the charging port to the charging controller.

18. The charging arrangement of claim 17, wherein the movement data and the drive control signal are based on the vision data.

19. The charging arrangement of claim 16, wherein the overhead moving system moves the connector along a vertical axis of the plurality of axes and at most one of a first horizontal axis perpendicular to the vertical axis and a second horizontal axis perpendicular to the vertical axis and the first horizontal axis.

* * * * *